United States Patent
Cornay et al.

(10) Patent No.: US 6,773,353 B2
(45) Date of Patent: Aug. 10, 2004

(54) CAM BAR CENTERING MECHANISM

(76) Inventors: Paul J. Cornay, 1218 Princeton Ct., Longmont, CO (US) 80501; Richard J. Carson, 1714 Ranae Dr., Loveland, CO (US) 80537; Pedro J. Narvaez, 1905 Tyler Ave., Longmont, CO (US) 80501

( * ) Notice: Subject to any disclaimer, the term of this patent is extended or adjusted under 35 U.S.C. 154(b) by 0 days.

(21) Appl. No.: 10/071,776

(22) Filed: Feb. 7, 2002

(65) Prior Publication Data

US 2003/0004002 A1 Jan. 2, 2003

Related U.S. Application Data

(60) Provisional application No. 60/267,017, filed on Feb. 7, 2001.

(51) Int. Cl.[7] .................................................. F16D 3/33
(52) U.S. Cl. ........................................ 464/50; 464/126
(58) Field of Search ................................ 464/114, 117, 464/118, 125, 126, 905, 50

(56) References Cited

U.S. PATENT DOCUMENTS

| | | | |
|---|---|---|---|
| 731,225 A | * | 6/1903 | Robinson ..................... 464/50 |
| 1,670,175 A | | 5/1928 | Wikoff |
| 1,702,363 A | | 2/1929 | Peters |
| 3,429,144 A | | 2/1969 | McIntosh |
| 3,782,135 A | * | 1/1974 | Beden ......................... 464/50 |
| 3,792,597 A | | 2/1974 | Orain |
| 5,425,676 A | * | 6/1995 | Cornay .................. 464/117 X |
| 5,967,004 A | | 10/1999 | Isbister |
| 6,251,020 B1 | | 6/2001 | Cornay |

FOREIGN PATENT DOCUMENTS

| | | | |
|---|---|---|---|
| DE | 698945 | * 11/1940 | .................. 464/50 |
| WO | WO00/36314 | 6/2000 | |

* cited by examiner

*Primary Examiner*—Greg Binda
(74) *Attorney, Agent, or Firm*—Garvey, Smith, Nehrbass & Doody, L.L.C.; Seth M. Nehrbass

(57) ABSTRACT

Universal joint (100) includes a centering mechanism (100A) for supporting the universal and forcing the two joint halves to operate at the same angle thereby causing the joint to operate at constant velocity at all angles. Each shaft (134, 135) of the joint (100) is rotatably connected to the centering mechanism (100A). Movement of one of the shafts (134, 135) at an angle relative to the longitudinal axis of the coupling yoke (136) is transmitted to the other shaft (135, 134) by the centering mechanism (100A) and the centering mechanism (100A) causes the other shaft (135, 134) to likewise move at the same angle relative to the longitudinal axis of the coupling yoke (136). The centering mechanism (100A) includes cam rods (102, 103) supported within a cam tube (101), which arrangement allows a full range of movement of the shafts (134, 135) at angles of 90 °.

32 Claims, 29 Drawing Sheets

CAM BAR CENTERING MECHANISM

CROSS-REFERENCE TO RELATED APPLICATIONS

Priority of our U.S. Provisional Patent Application Serial No. 60/267,017, filed Feb. 7, 2001, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates primarily to centering mechanisms. More particularly, the present invention relates primarily to centering mechanisms for universal joints.

2. General Background of the Invention

Universal joint designers have found it difficult to design constant velocity universal joints capable of operating at high angles, high speeds and high loads simultaneously, due to the limitations of existing constant velocity universal joint centering and supporting devices. This is due to the difficulty in packaging robust internal supporting devices that utilize rolling elements that are capable of operating at typical driveline speeds.

See U.S. Pat. No. 5,823,881 and all references cited therein for a background of the invention.

Hereby incorporated by reference are all prior patents and published applications of Paul J. Cornay, including U.S. Pat. Nos. 6,251,020; 6,139,435; 5,823,881; 5,425,676; Publication No. WO 00/36314; Publication No. WO 94/29604; Publication No. WO 91/00438; and all references cited therein.

BRIEF SUMMARY OF THE INVENTION

The apparatus of the present invention solves the problems confronted in the art in a simple and straightforward manner. What is provided is a cam rod centering mechanism. In a preferred embodiment of the present invention, the cam rod centering mechanism comprises a cam centering mechanism for universal joints. The invention is advantageous because it supports the universal joint with robust components in a relatively small package while allowing the universal joint to operate at high angles of misalignment from 0° through 90° while transmitting high torque loads at high speeds with low drive-line disturbances.

The self supported universal joints of the present invention are capable of operating at constant velocity at high angles, high speeds and high torque loads and provide design engineers with the following options: higher power transfer capability to driven members (e.g. wheels, power takeoffs); more options in drive-line placement; engines can be run at higher r.p.m. resulting in greater fuel economy; and tighter turning radiuses for vehicles.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
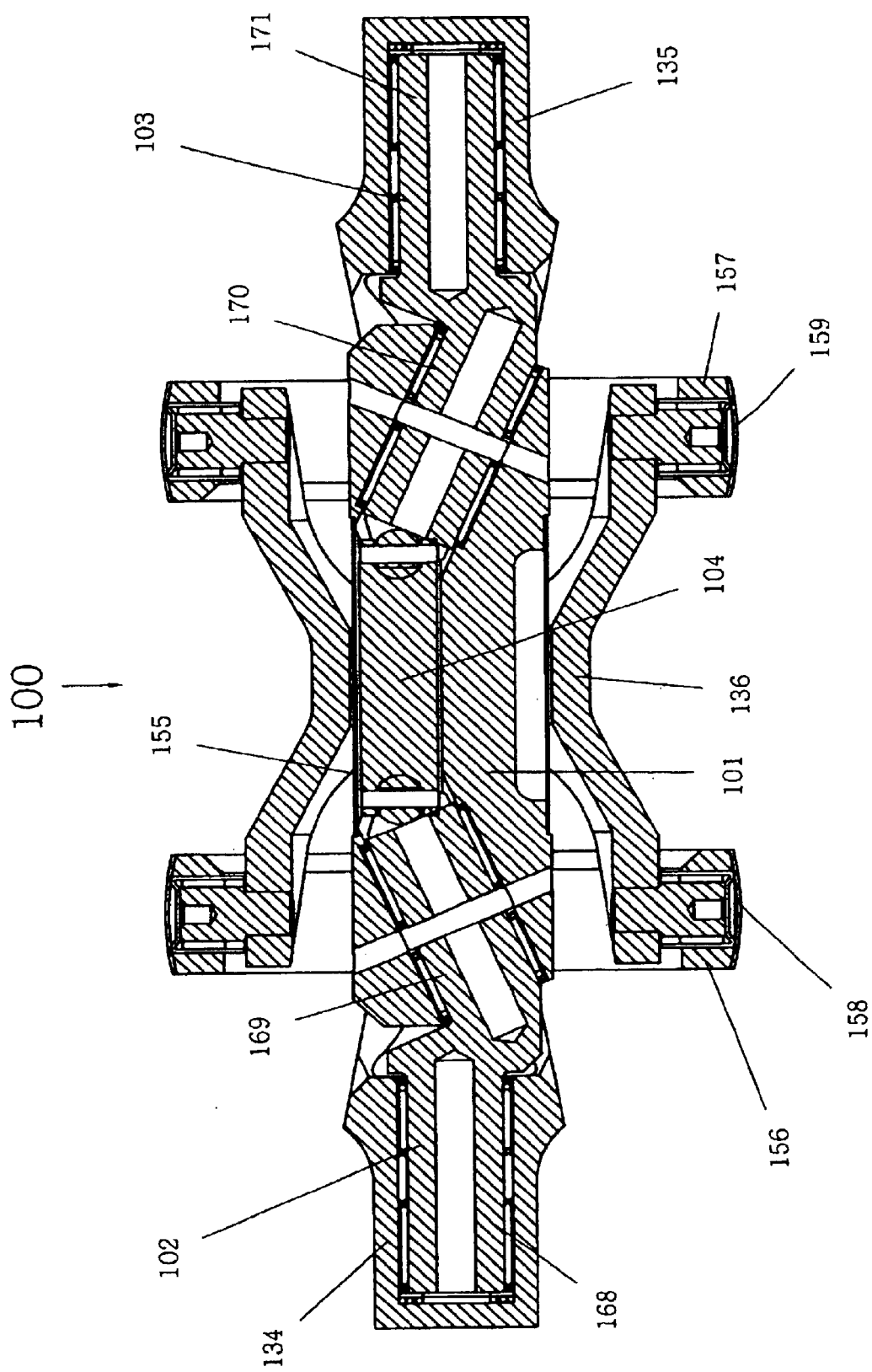
FIG. 1 is a perspective, partially sectional view of a first embodiment of the apparatus of the present invention with no angular joint displacement.

Universal joints 100, 200, 300, 400 and 500 include respective centering mechanisms 100A, 200B, 300C, 400D for supporting the universal joints and forcing the two joint halves to operate at the same angle thereby causing the joint to operate at constant velocity at all angles. For example, each shaft 134, 135 of the joint 100 is rotatably connected to the centering mechanism 100A. Movement of one of the shafts 134, 135 at an angle relative to the longitudinal axis of the connecting yoke 136 is transmitted to the other shaft 135, 134 by the centering mechanism 100A and the centering mechanism 100A causes the other shaft 135, 134 to likewise move at the same angle relative to the longitudinal axis of the connecting yoke 136. The centering mechanism 100A includes cam rods 102, 103 supported within a cam tube 101, which arrangement of bearings allows a full range of movement of the shafts 134, 135 at angles of 90°.

Universal joint 100 can be assembled by the following method:

First: Assembly of Centering mechanism 100A

Bearing assembly 113 is pressed into and to the bottom of hole 127 of cam tube 101. Bearing 116 is pressed into hole 127 of cam tube 101 so that the face of bearing 116 is flush with the opening of hole 127 of cam tube 101. This method is repeated with bearings 114 and 115 in hole 128 of cam tube 101. Cube 105 is inserted between yoke ears 141 of cam rod 102 so that hole 148 is in alignment with hole 143. Pin 109 is inserted through holes 143 and 148. Pin 109 has a press fit within hole 143 and a slip fit in hole 148. This method is repeated with cube 106 in yoke ears 142 with pin 110 in holes 144 and 147 on cam rod 103. Cam rod 102 with cube 105 and pin 109 is inserted into bearings 116 and 113 within cam tube 101. This same process is repeated with cam rod 103 and cube 106 and pin 110 and bearings 114 and 115 within cam tube 101. Inner joint connecting yoke 104 is inserted into window 129 of cam tube 101 so that yoke ears 137 and 138 of inner joint connecting yoke 14 slip over cubes 15 and 16. With holes 151 and 145 and 149 aligned pin 107 is inserted thereby connecting cam rod 102 to inner joint connecting yoke 104 with pins 107 and 109 with cube 105. This same process is repeated with inner joint connecting yoke 104 and cube 106 and cam rod 103 with pins 108 and 110 in holes 146 and 152. This completes the assembly of the centering mechanism.

Figure 7:
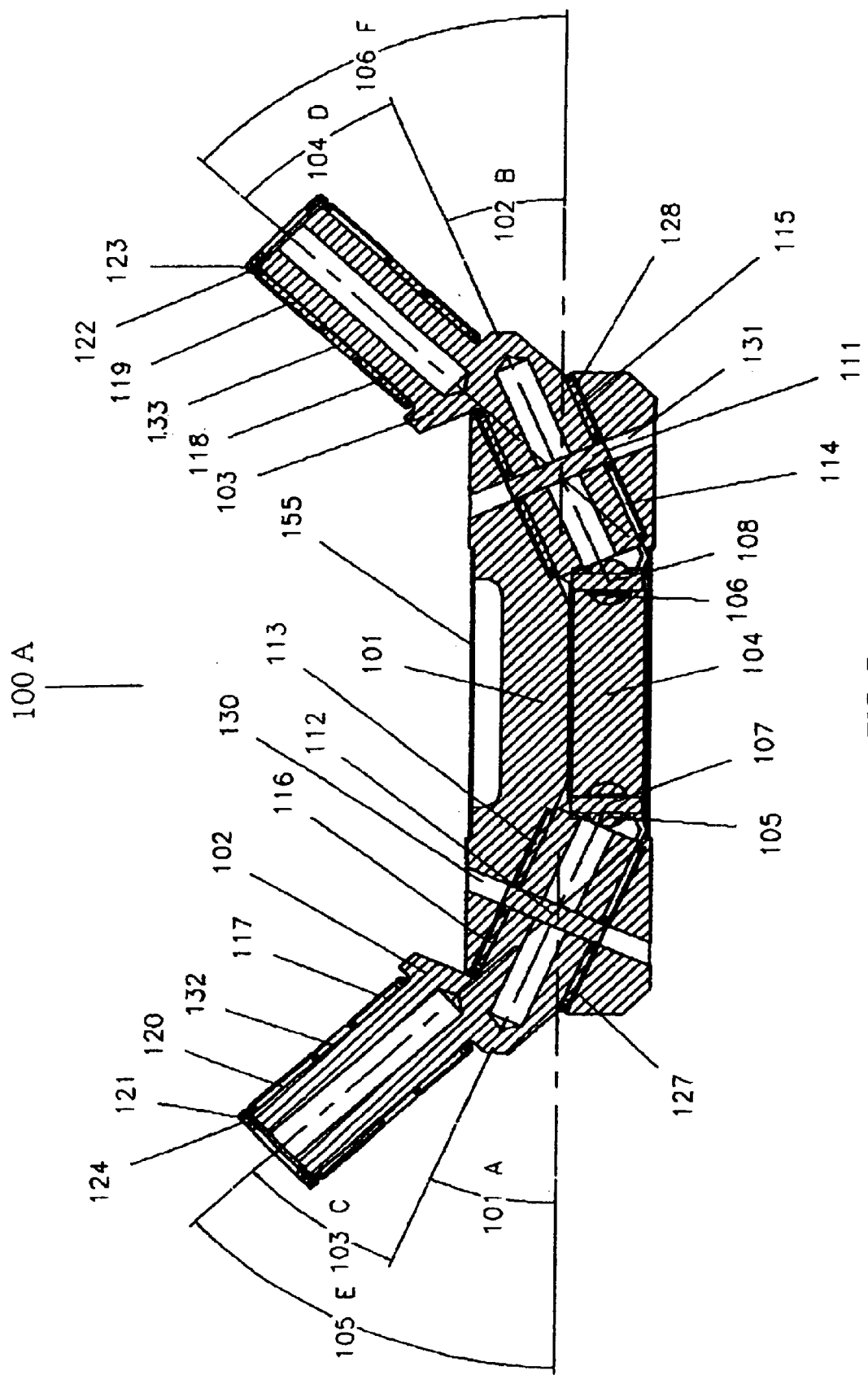
FIG. 7 is a perspective, partially sectional view of the centering mechanism of the first embodiment of the apparatus of the present invention with angular joint displacement.
Figure 8:
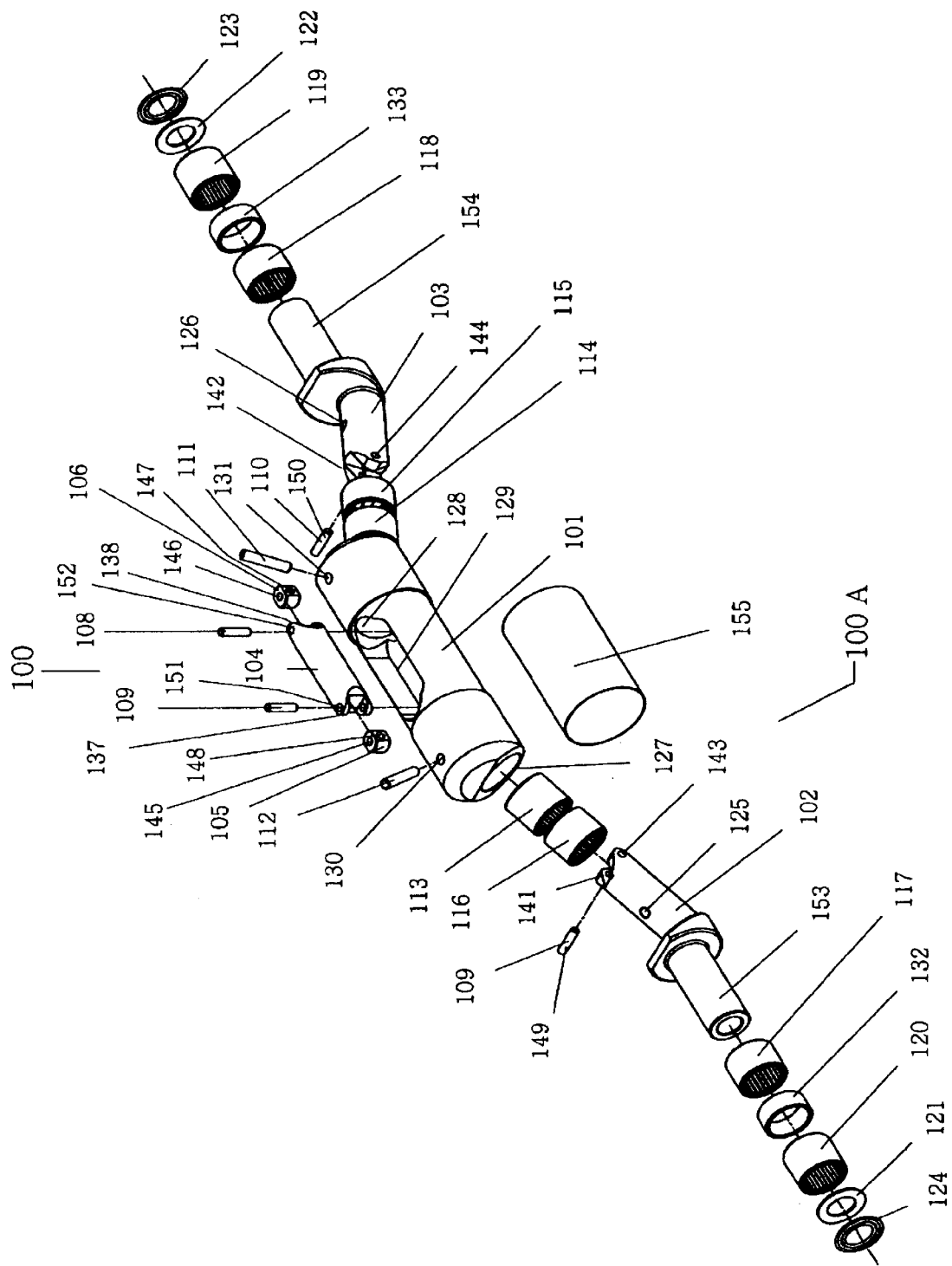
FIG. 8 is an exploded view of the centering mechanism of the first embodiment of the apparatus of the present invention.
Figure 9:
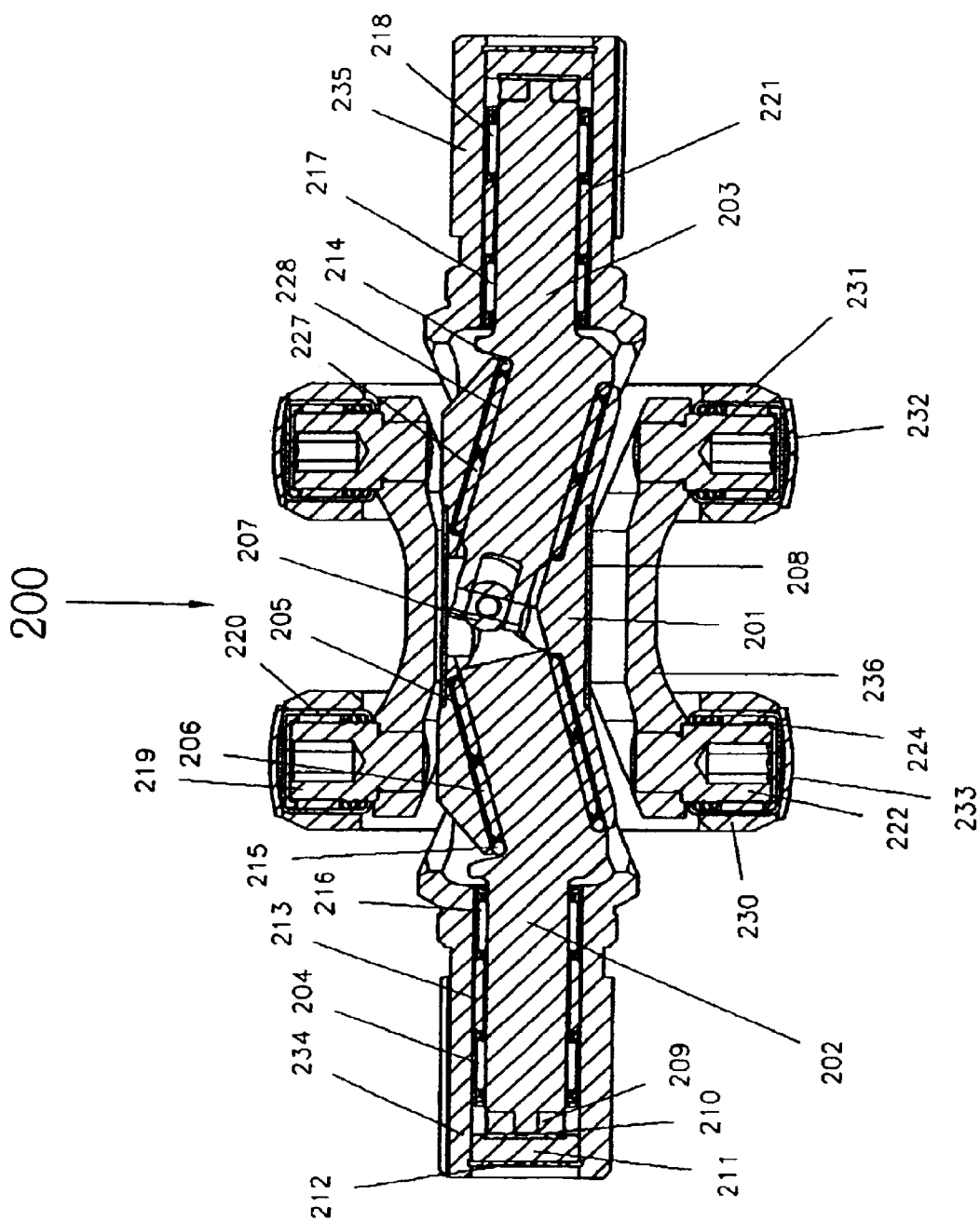
FIG. 9 is a perspective, partially sectional view of a second embodiment of the apparatus of the present invention with no angular joint displacement.
Figure 10:
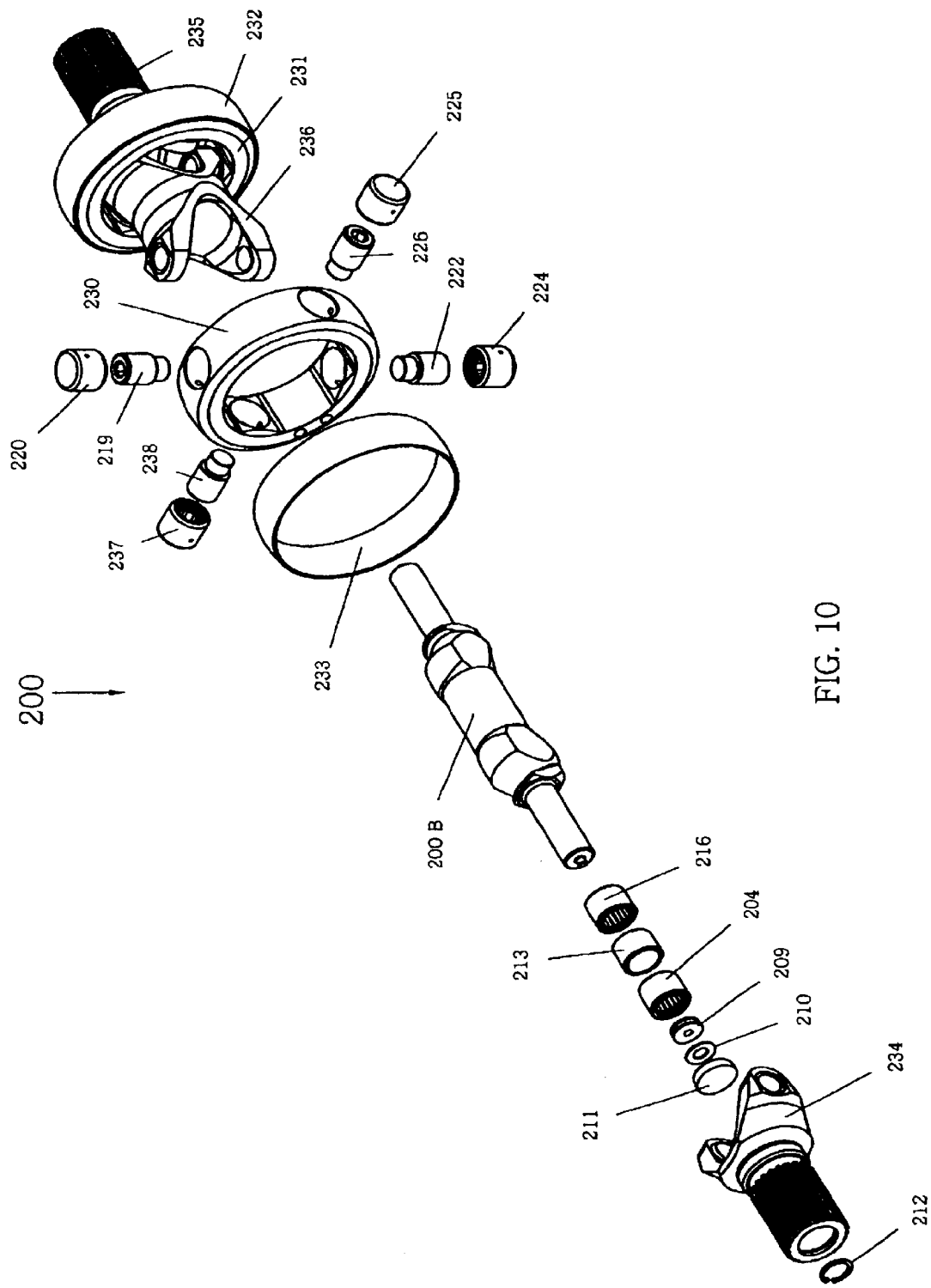
FIG. 10 is an exploded view of the second embodiment of the apparatus of the present invention.
Figure 11:
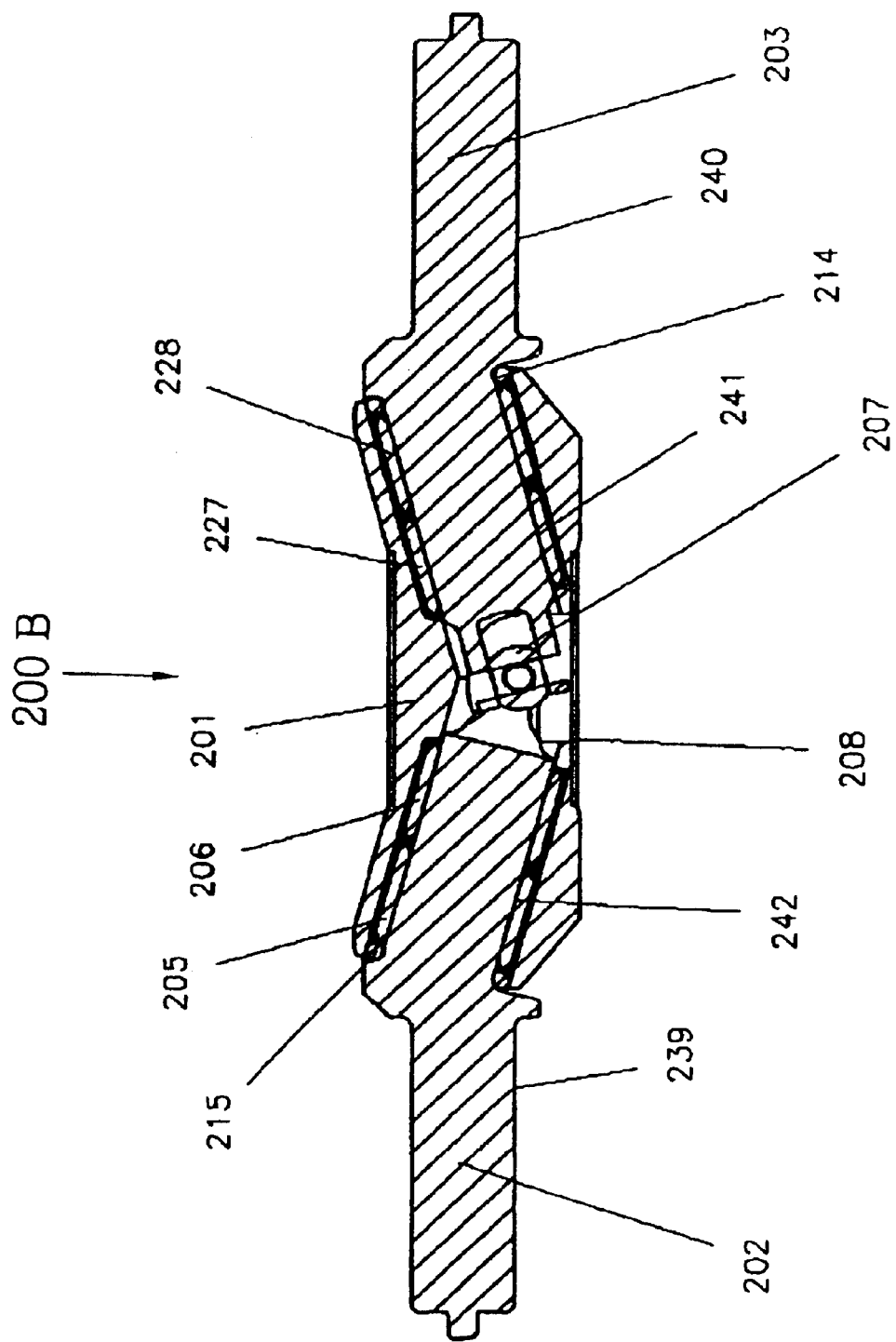
FIG. 11 is a partially sectional view of the centering mechanism of the second embodiment of the apparatus of the present invention with no angular centering mechanism displacement.

Angles 101A and 102B of cam tube 101 together with angles 103C and 104D of cam rods 102 and 103, of FIG. 7, combine to create angles 105E and 106F of centering mechanism 100A. Angle 105E and angle 106F are always equal when cam rod 102 is rotated within cam tube 101 causing an equal magnitude of rotation of cam rod 103 within cam tube 101. In other words if angle 101A is equal to angle 102B of cam tube 101 and angle 103C is equal to angle 104D of cam rods 102 and 103 then when cam rod 102 is rotated with cam tube 101 thereby rotating cam rod 103 then angle 105E will equal angle 106F. The sum of angles 105E and 106F can range from 0° through a maximum angle which equals the sum of angle 101A, 102B, 103C and 104D (e.g. 90°).

Assembly of joint 100 can be similar to assembly of prior art joints.

Even if not part of a universal joint (such as in robotics applications), centering mechanism 100A could also be used to join and support two tubes or beams, while allowing for angular misalignment of the two members. In such a case, centering mechanism 100A acts as a universal connector. Appropriate connection means (such bores in the first and second members) can be used for connecting the first cam rod to the first member and for connecting the second cam rod to a second member. The first and second members can be shafts, tubes, or construction members.

Universal joint 100 includes a first ring 156 and a second ring 157, a first yoke and a second yoke disposed within the first ring 156 and the second ring 157, respectively, and a first shaft 134 and a second shaft 135. The first yoke (on the left side of connecting yoke member 136 in FIG. 5) and the second yoke (on the right side of connecting yoke member 136 in FIG. 5) are connected with a coupling means (a short shaft member) as shown in FIGS. 1–5. The first and second yokes and the coupling means are all part of connecting member 136. First pin means (pins 164 and 166) pivotally interconnect the first yoke and the first ring 156, second pin means (pins 165 and 167) pivotally interconnect the first shaft 134 and the first ring 154, third pin means pivotally interconnect the second yoke and the second ring 157, and fourth pin means interconnect the second shaft 135 and the second ring 157. The coupling means (a short shaft member as shown in FIGS. 1–5) interconnects the first yoke and the second yoke. A plurality of bearing means (including bearing cups 160, 161, 162, 163) receive the pin means. Centering means 100A interconnects the first shaft 134 and the second shaft 135; centering means 100A includes a first cam rod 102 rotatably coupled to a second cam rod 103.

In the embodiments of the present invention shown in the drawings, each shaft of each universal joint is connected to a ring through a yoke, as shown. All joints shown are symmetrical, so parts not specifically numbered in the drawings are the same as their numbered counterparts on the other half of the joints.

As can be seen in FIGS. 1–5, there are bearing means in each ring 156, 157, the bearing means in the first ring 156 receiving the first second pin means, and the bearing means in the second ring 157 receiving the third and fourth pin means.

Figure 2:
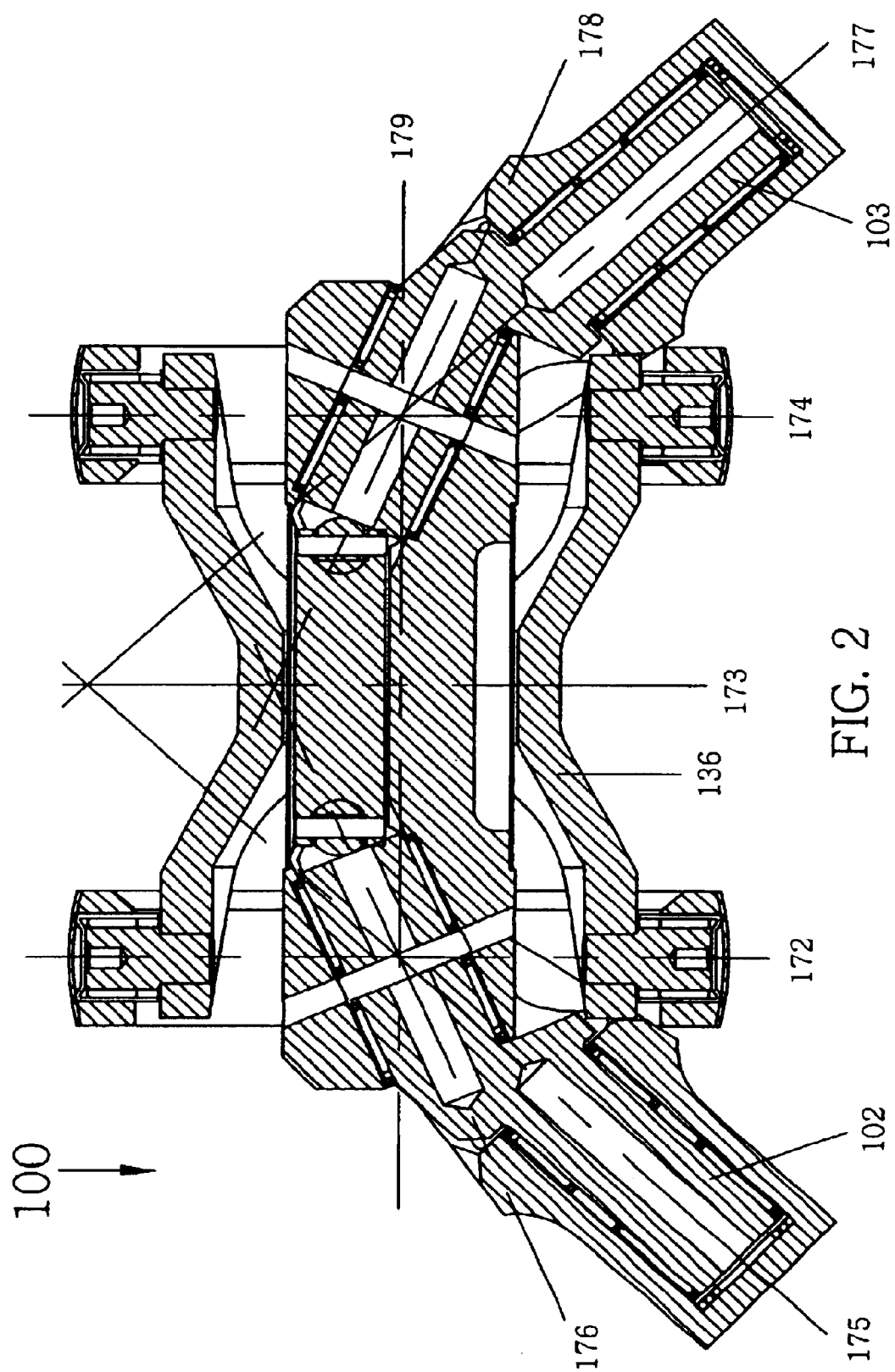
FIG. 2 is a perspective, partially sectional view of the first embodiment of the apparatus of the present invention with angular joint displacement.
Figure 3:
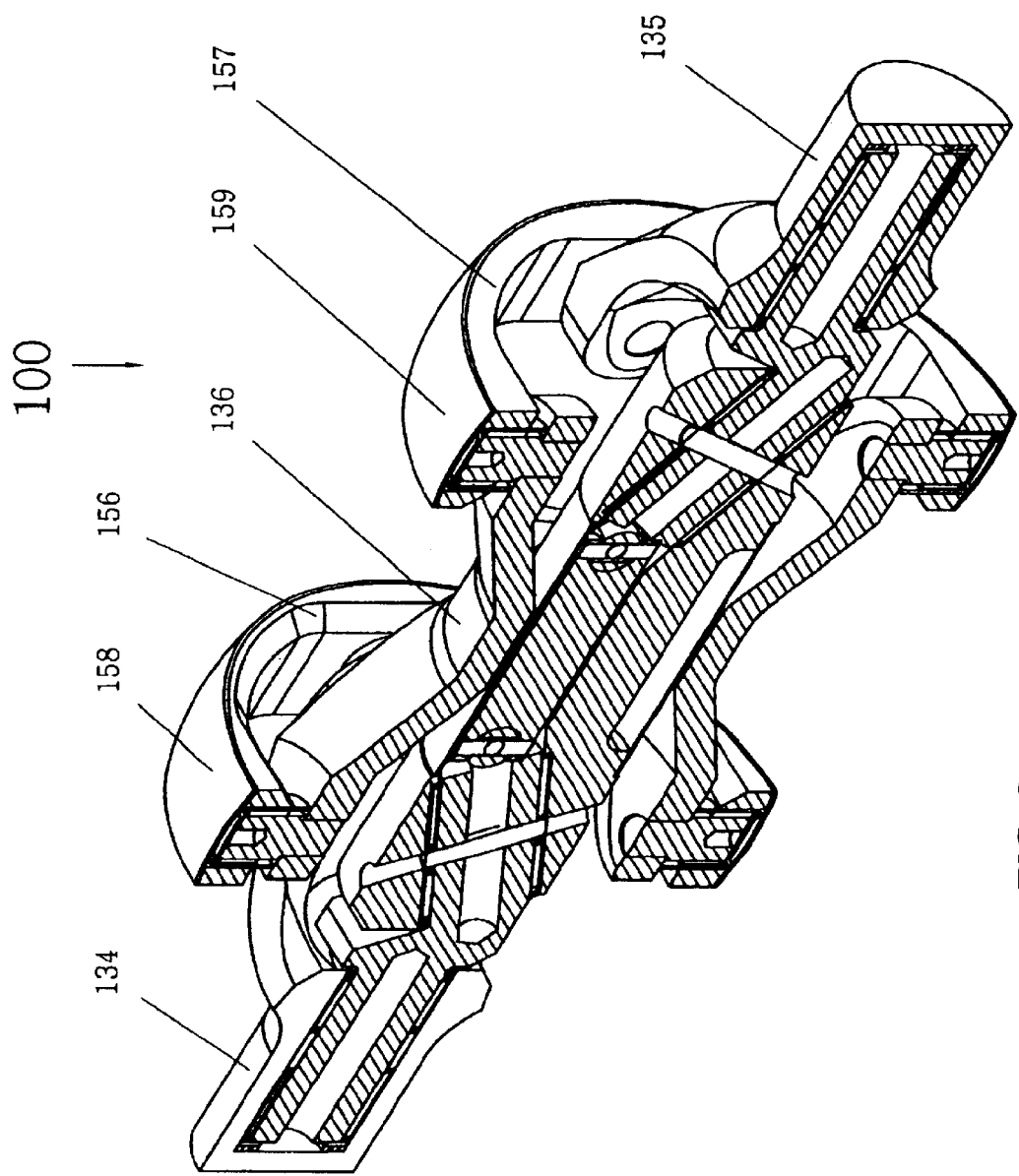
FIG. 3 is a isometric perspective view of the first embodiment of the apparatus of the present invention with no angular joint displacement.
Figure 4:
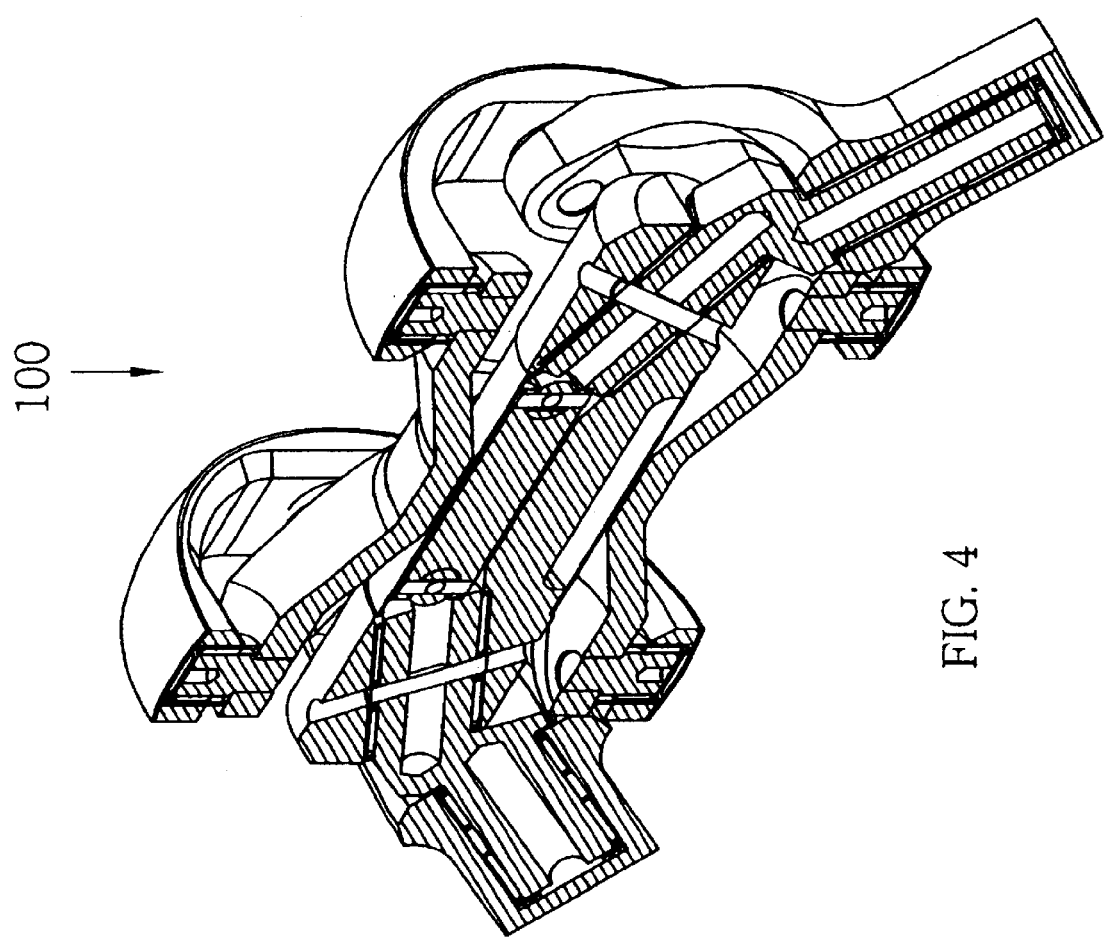
FIG. 4 is a isometric perspective, partially sectional view of the first embodiment of the apparatus of the present invention with angular joint displacement.
Figure 5:
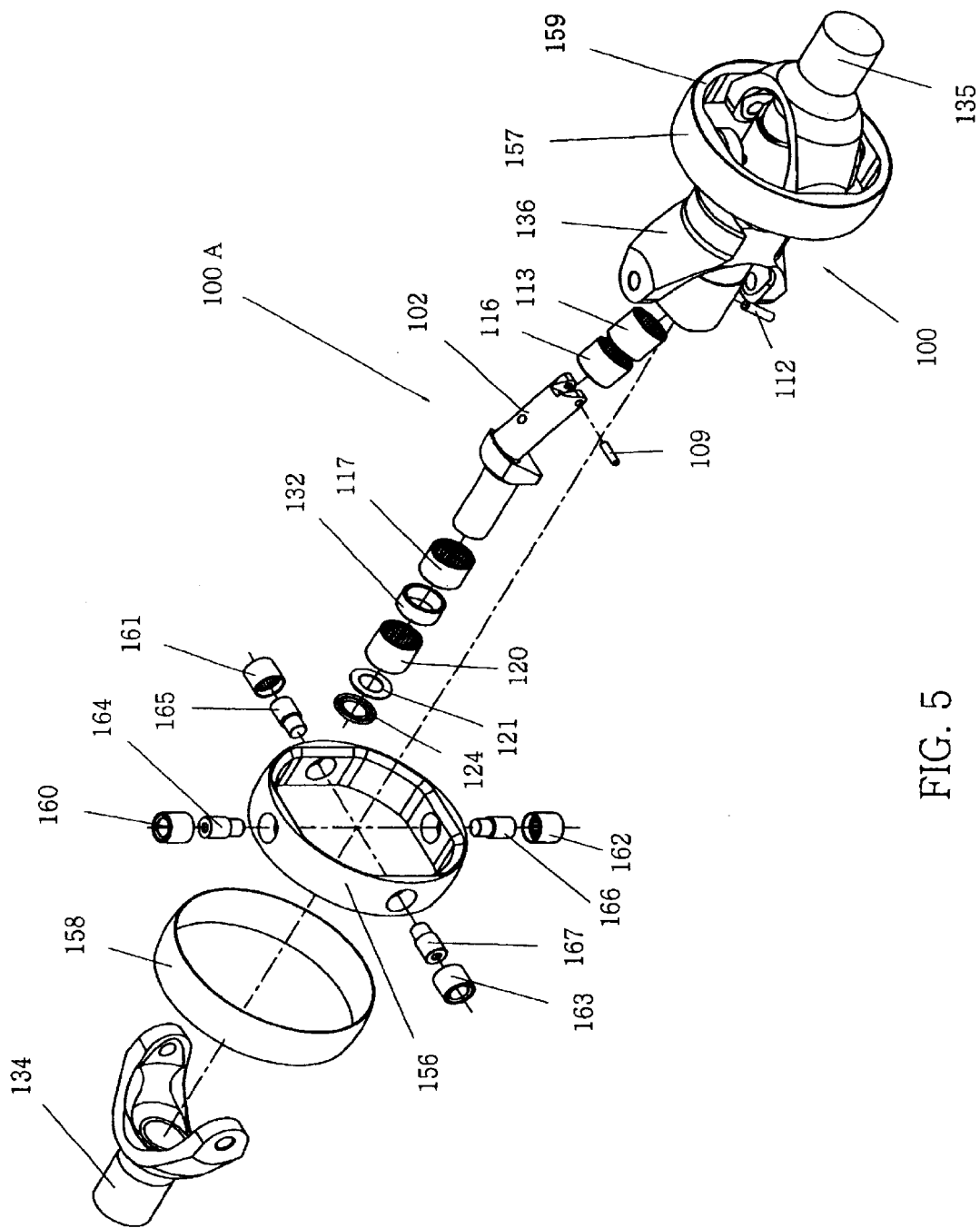
FIG. 5 is an exploded view of the first embodiment of the apparatus of the present invention.
Figure 6:
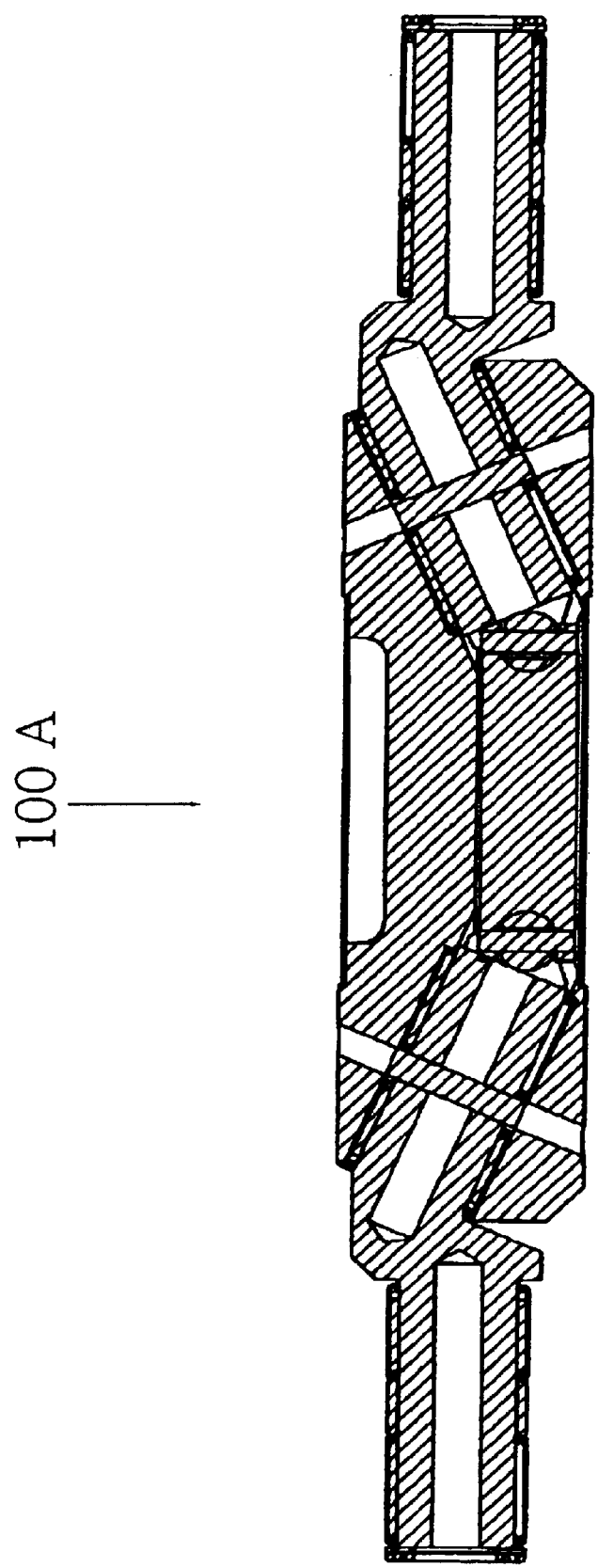
FIG. 6 is a perspective, partially sectional view of the centering mechanism of the first embodiment of the apparatus of the present invention with no angular joint displacement.

As can be seen in FIGS. 1 and 2, the first cam rod 102 includes a first section 168 having a first axis of rotation 175 and a second section 169, offset from the first section, having a second axis of rotation 176; and the second cam rod 103 includes a first section 171 having a first axis of rotation 177 and a second section 170, offset from the first section, having a second axis of rotation 178.

The axes of rotation 175, 176 of the first cam rod 102 intersect the pivot center 172 of the first and second pin means and the axes of rotation 177, 178 of the second cam rod 103 intersect the pivot center 174 of the third and fourth pin means. The intersection of the axes 175 and 176 of cam rod 102 with axes 177 and 178 of cam rod 103 most preferably occurs at the joint's pivot center and bisecting angle plane 173 of the joint 100 for proper function.

Cam tube 101 receives and supports the cam rods 102 and 103 in a manner in which both cam rods 102,103 are rotatably supported at equal angles within the cam tube 101.

Universal joints 100, 200, 300, 400, 500 include respectively a first shaft 134, 234, 334, 434, and 534, a second shaft 135, 235, 335, 435, and 535, coupling means 136, 236, 336, 436, 536, for transmitting torque from the first shaft to the second shaft, and centering means 100A, 200B, 300C, 400D, and 300C, interconnecting the first shaft and the second shaft for causing the second shaft to move at the same angle relative to the coupling means as does the first shaft, the centering means comprising a first cam rod 102, 202, 302, 402, and 302 and a second cam rod 103, 203, 303, 403, and 303 rotatably coupled to the first cam rod. Each cam rod 102, 103, 202, 203, 302, 303, 402, 403 includes a first straight section 168, 171, 239, 240, 343, 344, 441, 442, and a second straight section 169, 170, 241, 242, 345, 346, 443, 444, each straight section having a longitudinal axis, and the longitudinal axes of the two straight sections forming an angle, and the angle of the first cam rod is equal to the angle of the second cam rod. Both cam rods 102, 103, 202, 203, 302, 303, 402, 403 are rotatably supported at equal angles within cam tube 101, 201, 301, 401. The cam tubes includes bores 127, 128, 227, 228, 316, 317, 427, 428 which support the cam rods at equal angles to each other, and which are the same angle as the cam rods, such that when rotating the coupled cam rods within the cam tube, the axes of the second straight sections of the cam rods can align themselves to one another or can be misaligned with respect to one another up to an angle equal to four times the angle of the cam rod. First cam rod 102, 202, 302, 402 and second cam rod 103, 203, 303, 403 are longitudinally aligned at equal angles within cam tube 101, 201, 301, 301.

As can be seen in FIGS. 1, 2, and 7, the longitudinal axis 179 of the coupling means 136 intersects the axes of rotation of the first cam rod 102 where the axis of rotation 175, 176 of the first cam rod 102 intersect one another; and the longitudinal axis 179 of the coupling means 136 intersects the axes of rotation 177, 178 of the second cam rod 103 where the axes of rotation of the second cam rod intersect one another.

Universal joint 200 is substantially similar to universal joint 100 except that centering mechanism 200B has a single pin and cube universal joint coupling cam rod 202 to cam rod 203. First cam rod 202 is rotatably coupled to the second cam rod 203 by a pin and cube universal joint which is supported within cam tube 201. The pin and cube universal joint of joint 200 is similar to the pin and cube universal joint of joint 100 but includes a single cube 207. Even if not part of a universal joint (such as in robotics applications), centering mechanism 200B could also be used to join and support two tubes or beams, while allowing for angular misalignment of the two members. Universal joint 200 does not provide for as much angular misalignment as does universal joint 100.

Figure 12:
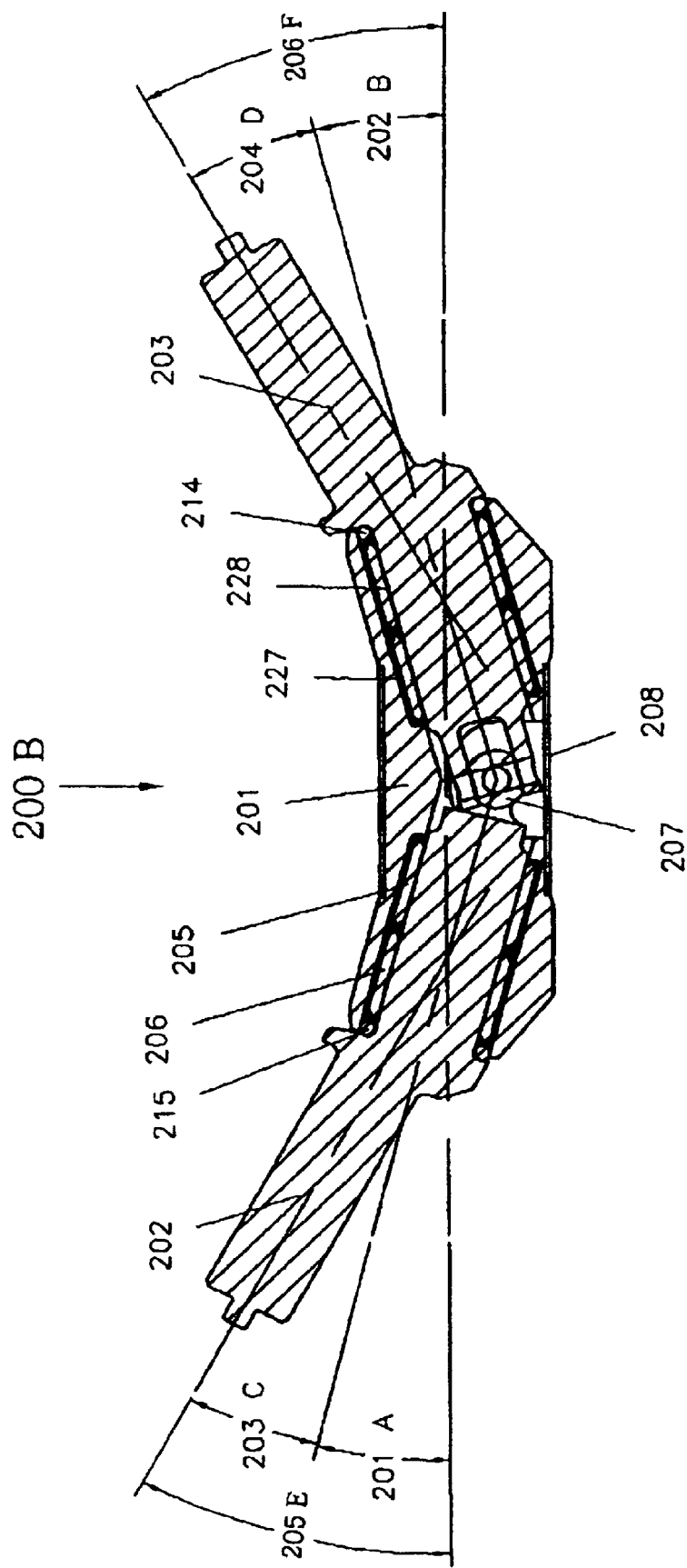
FIG. 12 is a partially sectional view of the centering mechanism of the second embodiment of the apparatus of the present invention with angular centering mechanism displacement.
Figure 13:
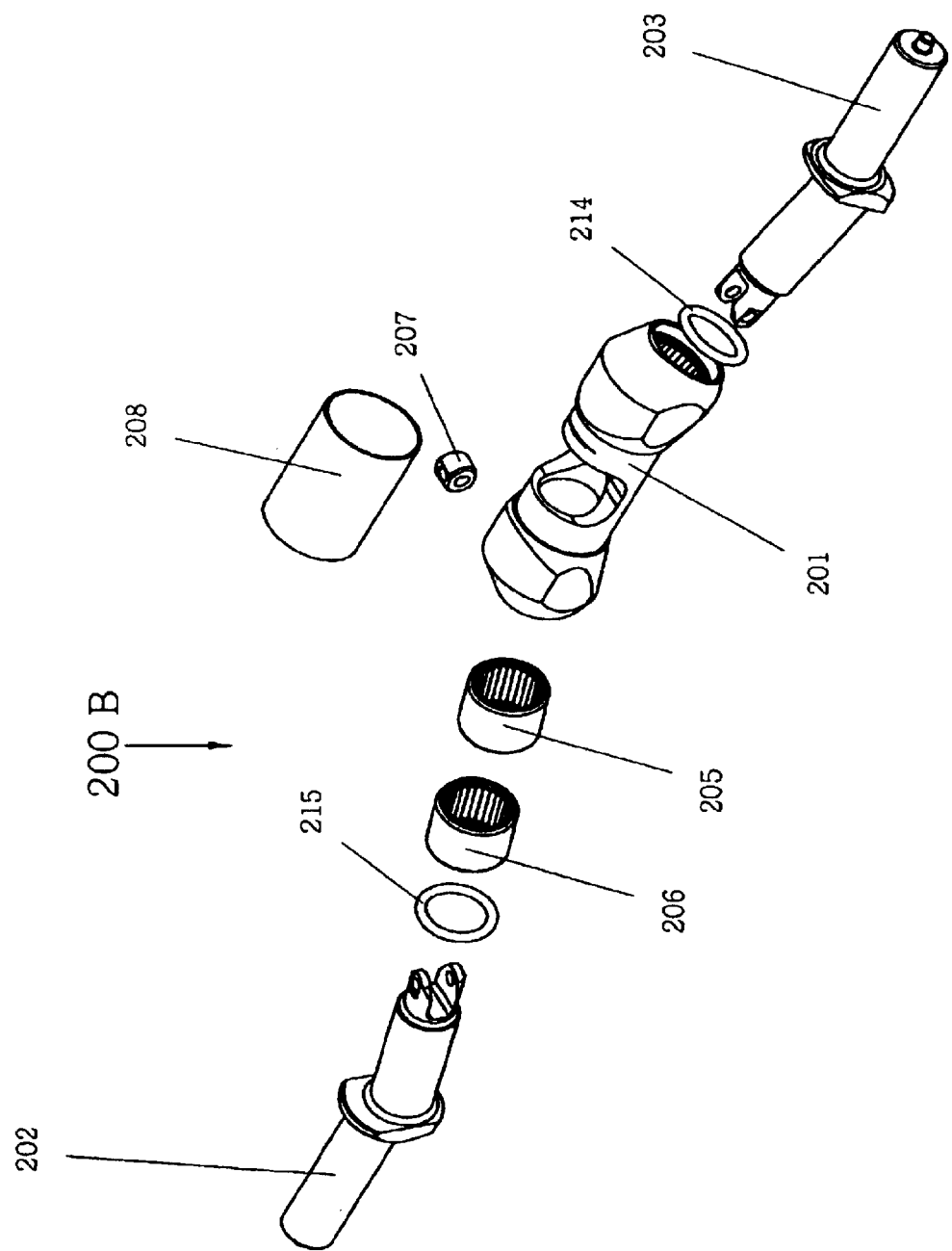
FIG. 13 is an exploded view of the centering mechanism of the second embodiment of the apparatus of the present invention.
Figure 14:
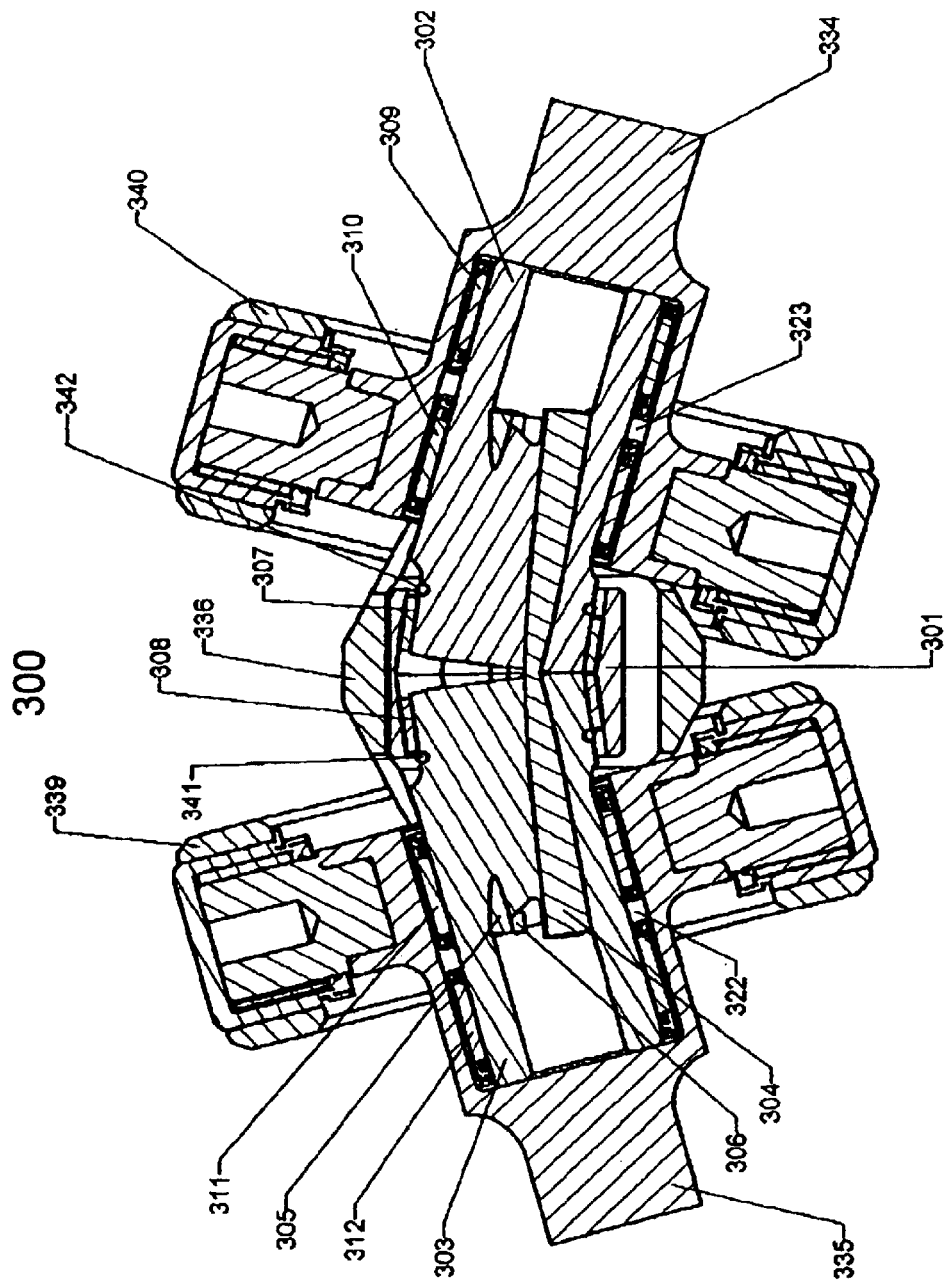
FIG. 14 is a perspective, partially sectional view of a third embodiment of the apparatus of the present invention with angular joint displacement.
Figure 15:
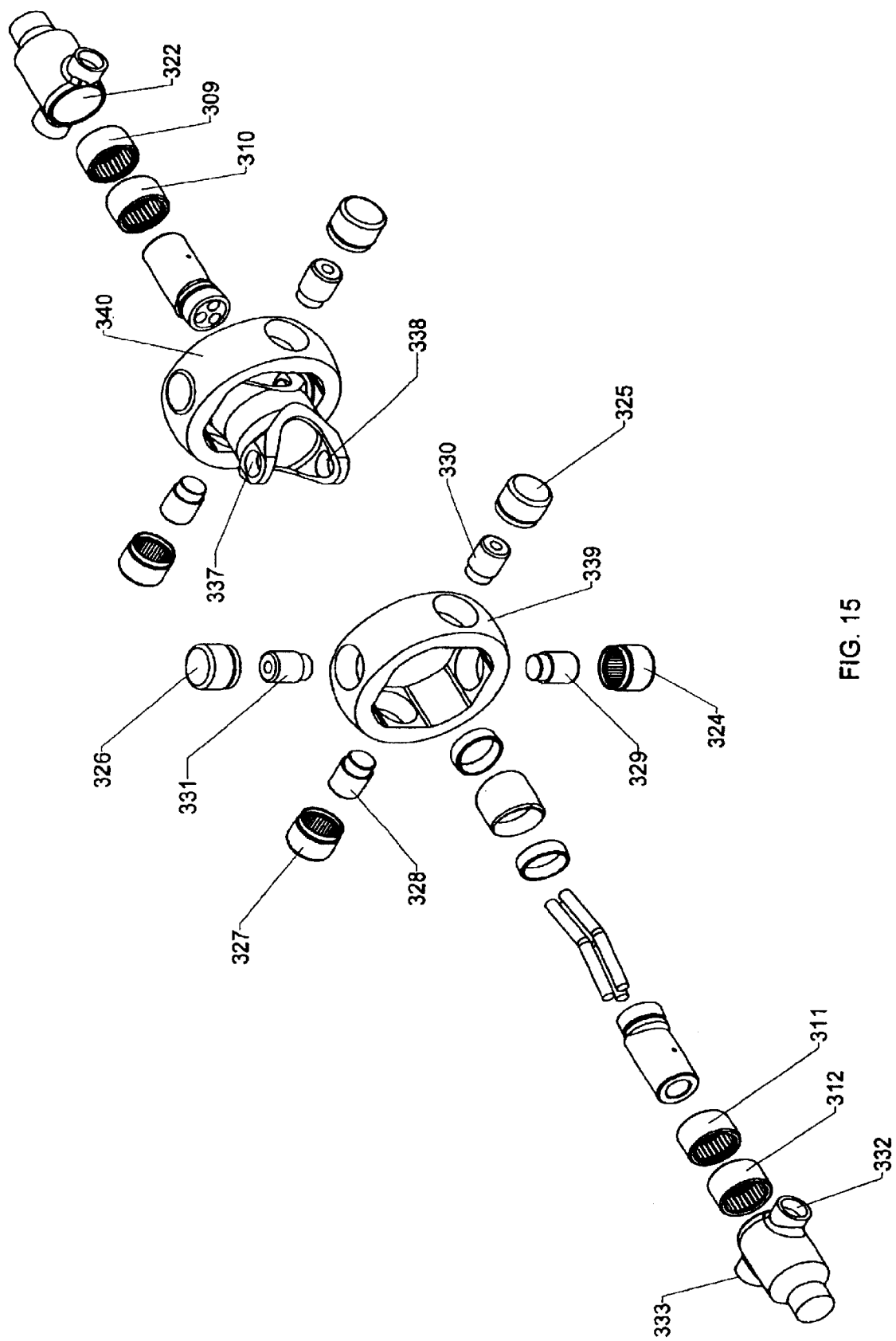
FIG. 15 is an exploded view of the third embodiment of the apparatus of the present invention.
Figure 16:
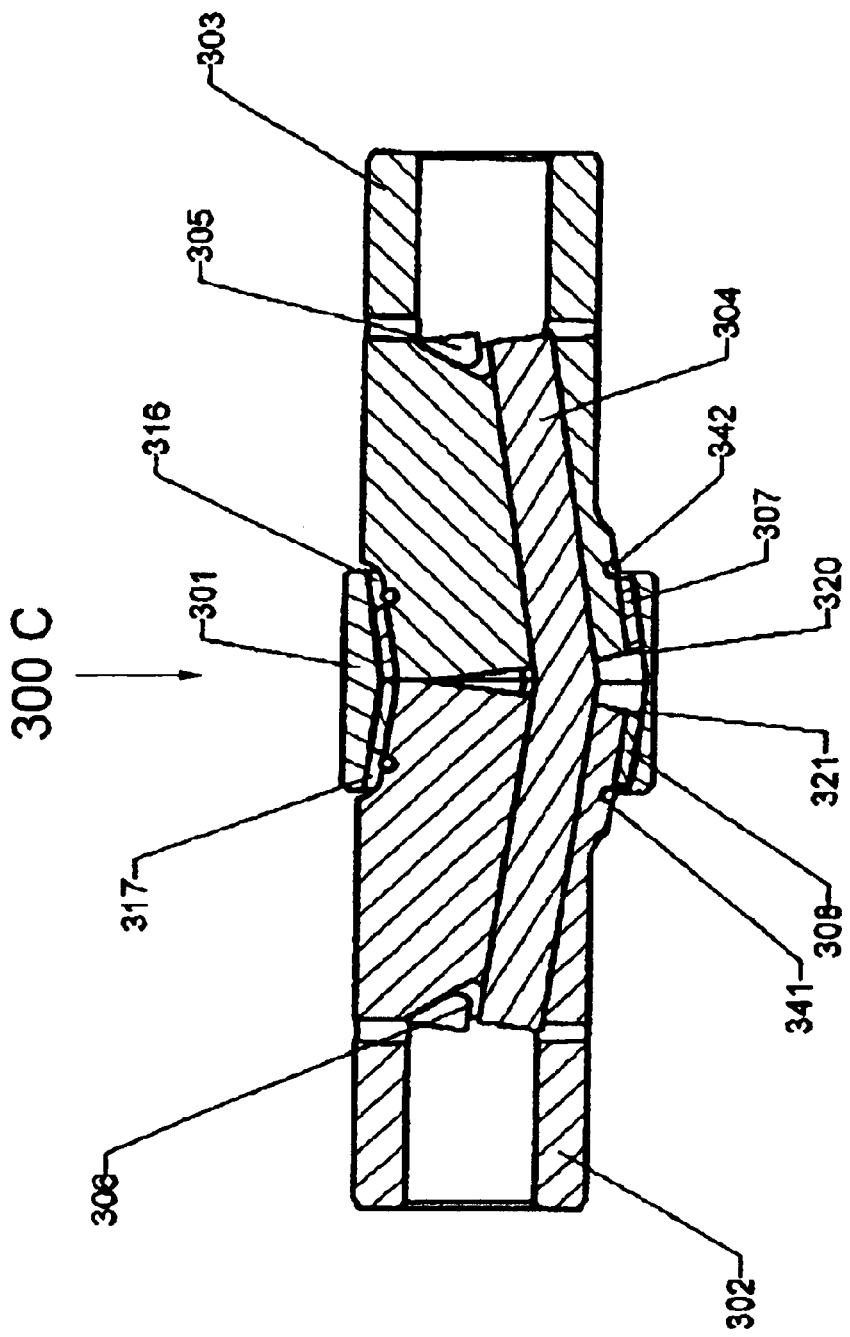
FIG. 16 is a partially sectional view of the centering mechanism of the third embodiment of the apparatus of the present invention with no angular centering mechanism displacement.

Angles 201A and 202B of cam tube 201 together with angles 203C and 204D of cam rods 202 and 203, see FIG. 12, combine to create angles 205E and 206F of centering mechanism 200B. Angle 205E and angle 206F are always equal when cam rod 202 is rotated within cam tube 201 causing an equal magnitude of rotation of cam rod 203 within cam tube 201. In other words if angle 201A is equal to angle 202B of cam tube 201 and angle 203C is equal to angle 204D of cam rods 202 and 203 then when cam rod 202 is rotated with cam tube 201 thereby rotating cam rod 203 then angle 205E will equal angle 206F. The sum of angles 205E and 206F can range from 0° through a maximum angle which equals the sum of angle 201A, 202B, 203C and 204D (e.g. 90°)

Universal joint 300 includes a centering mechanism 300C for supporting the universal joint and forcing the two joint halves to operate at the same angle thereby causing joint 300 to operate at constant velocity at all angles. Each shaft 334, 335 of the joint 300 is rotatably connected to the centering mechanism 300C. Movement of one of the shafts 334, 335 at an angle relative to the longitudinal axis of the connecting yoke member 336 is transmitted to the other shaft 335, 334 by the centering mechanism 300C and the centering mechanism 300C causes the other shaft 335, 334 to likewise move at the same angle relative to the longitudinal axis of the connecting yoke member 336. The centering mechanism B includes cam rods 302, 303 supported by bent rods 304, 305 and 306. Rotation of cam rod 302 along the axis of rotation of bent rods 304, 305 and 306 results in a corresponding rotation of cam rod 303 along the angulated axis of rotation of bent rods 304, 305 and 306. Cam rods 302 and 303 combine with bent rods 304, 305 and 306 to form a mechanism similar to a "bent pin coupling". Universal joint 300 can be assembled by the following method:

First: Assembly of the Centering Mechanism 300C

Bearing seal assembly 307 is pressed into the bottom of hole 317 of cam tube 301. This method is repeated with bearing 308 hole 316 of cam tube 301. Cam rod 302 is inserted into bearing seal 307. Bent rod 304, 305 and 306 are inserted into holes 318, 319 and 313 of cam rod 302. Cam rod 303 is inserted into bearing seal 308 so that thrust surfaces 320 and 321 are in contact. This completes the assembly of the centering mechanism 300C.

Bearings 309 and 310 are inserted into hole 323 of the yoke of shaft 334. This process is repeated with bearings 311 and 312 in hole 322 of the yoke of shaft 335. Centering mechanism 300C is installed into joint 300 in the same manner that centering mechanism 200B is installed into joint 200. The same method of assembly of joint 200 can be used for the assembly of joint 300.

Figure 17:
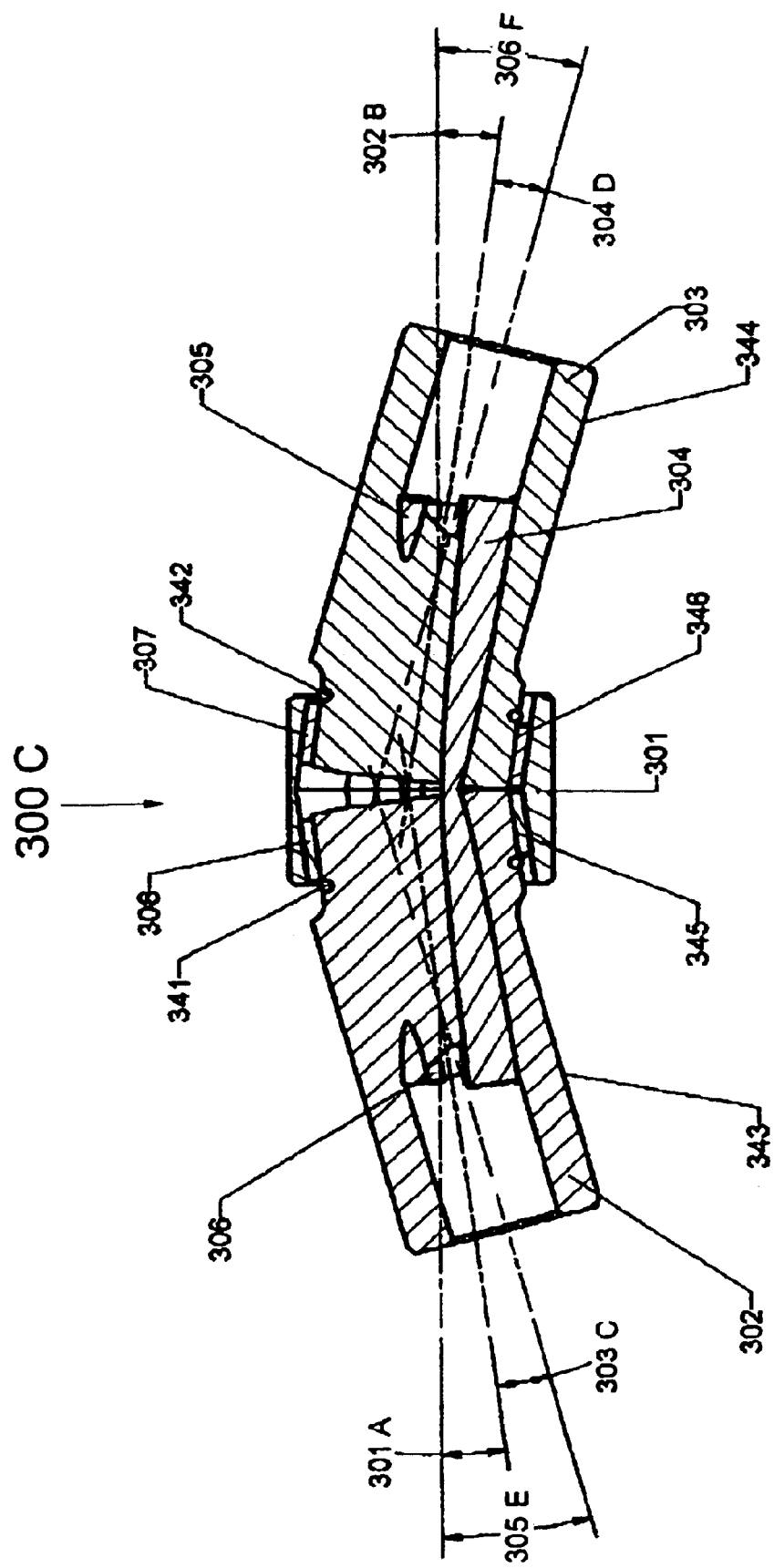
FIG. 17 is a partially sectional view of the centering mechanism of the third embodiment of the apparatus of the present invention with angular centering mechanism displacement.
Figure 18:
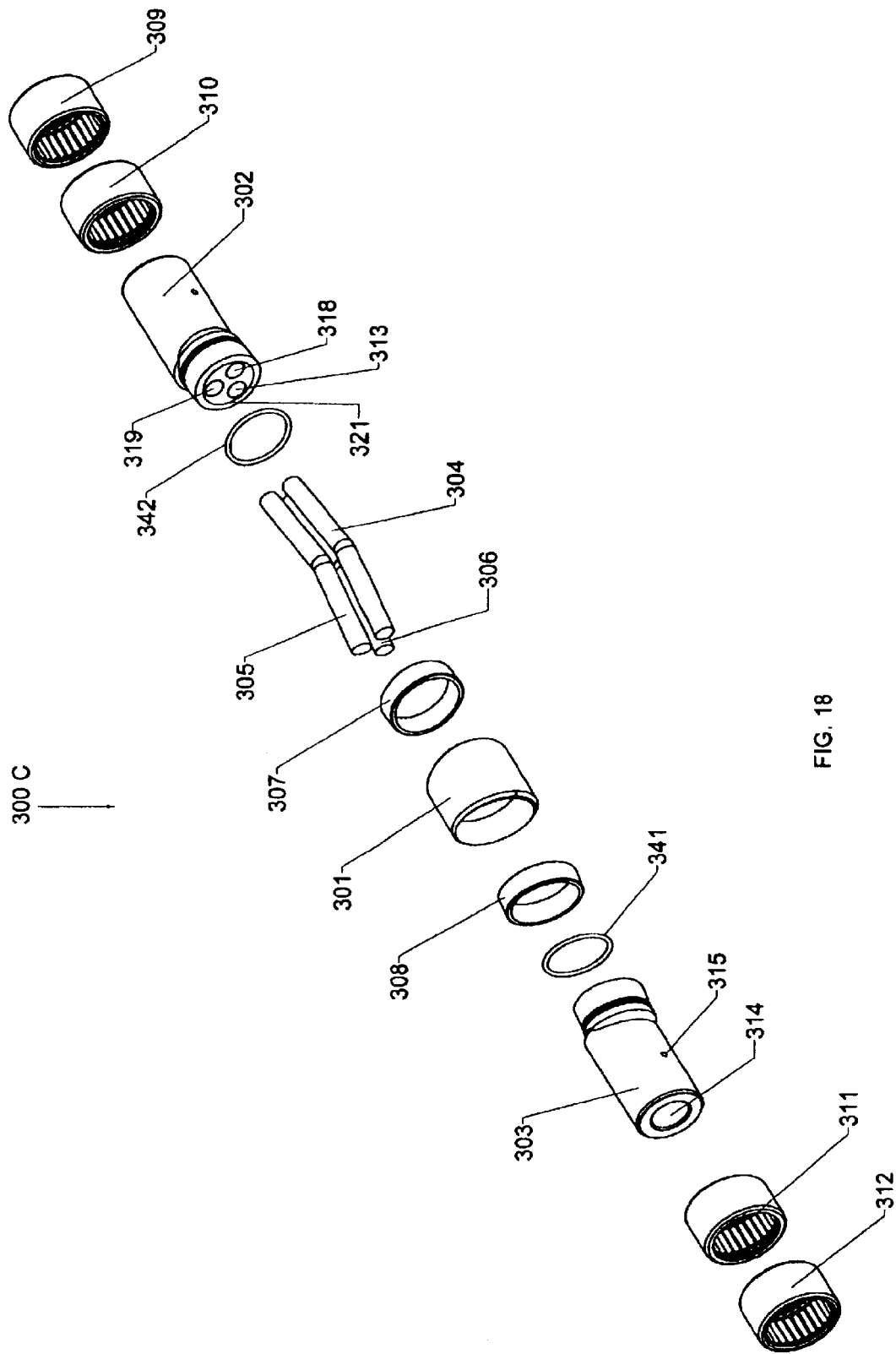
FIG. 18 is an exploded view of the centering mechanism of the third embodiment of the apparatus of the present invention.
Figure 19:
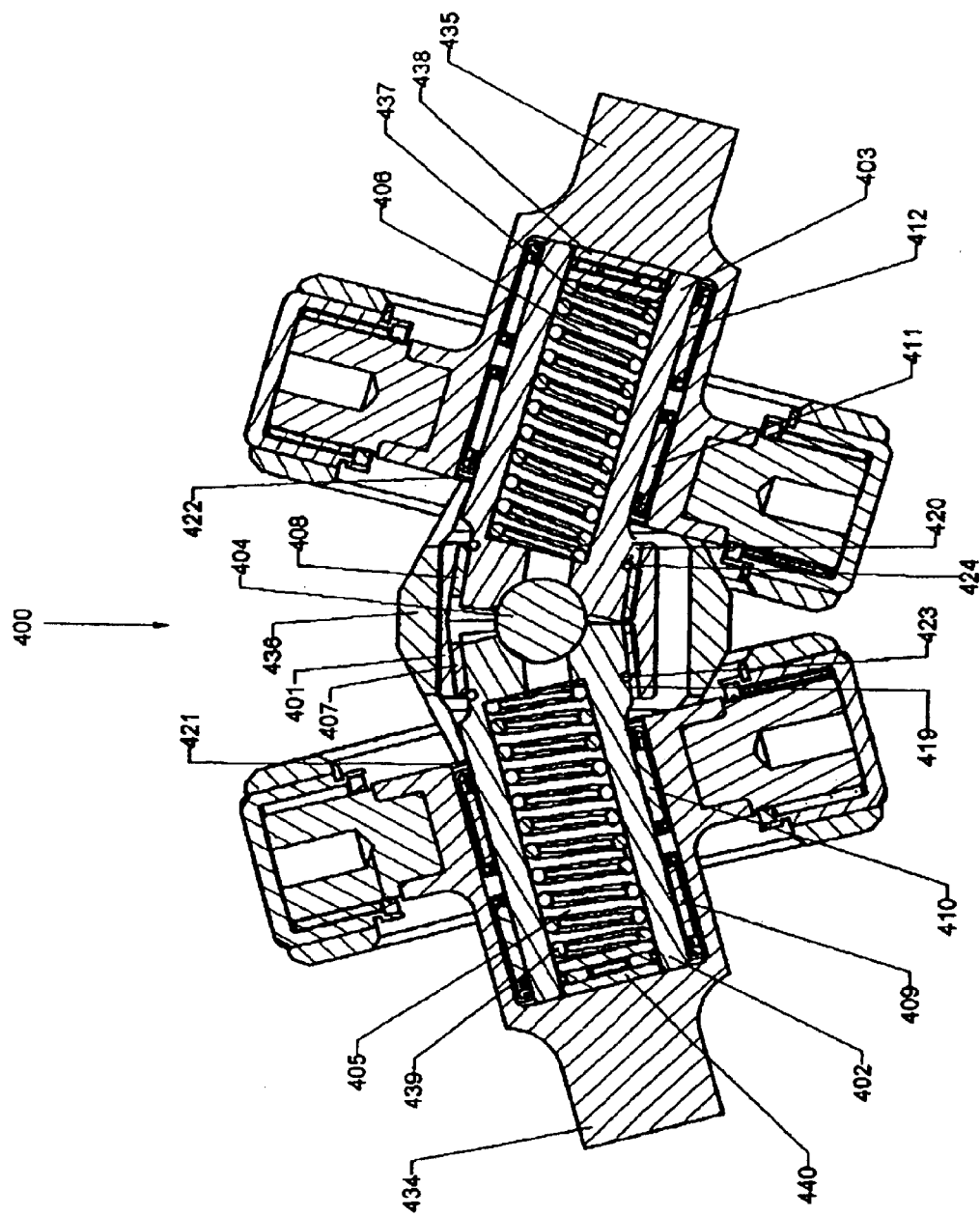
FIG. 19 is a perspective, partially sectional view of a fourth embodiment of the apparatus of the present invention with angular joint displacement.
Figure 20:
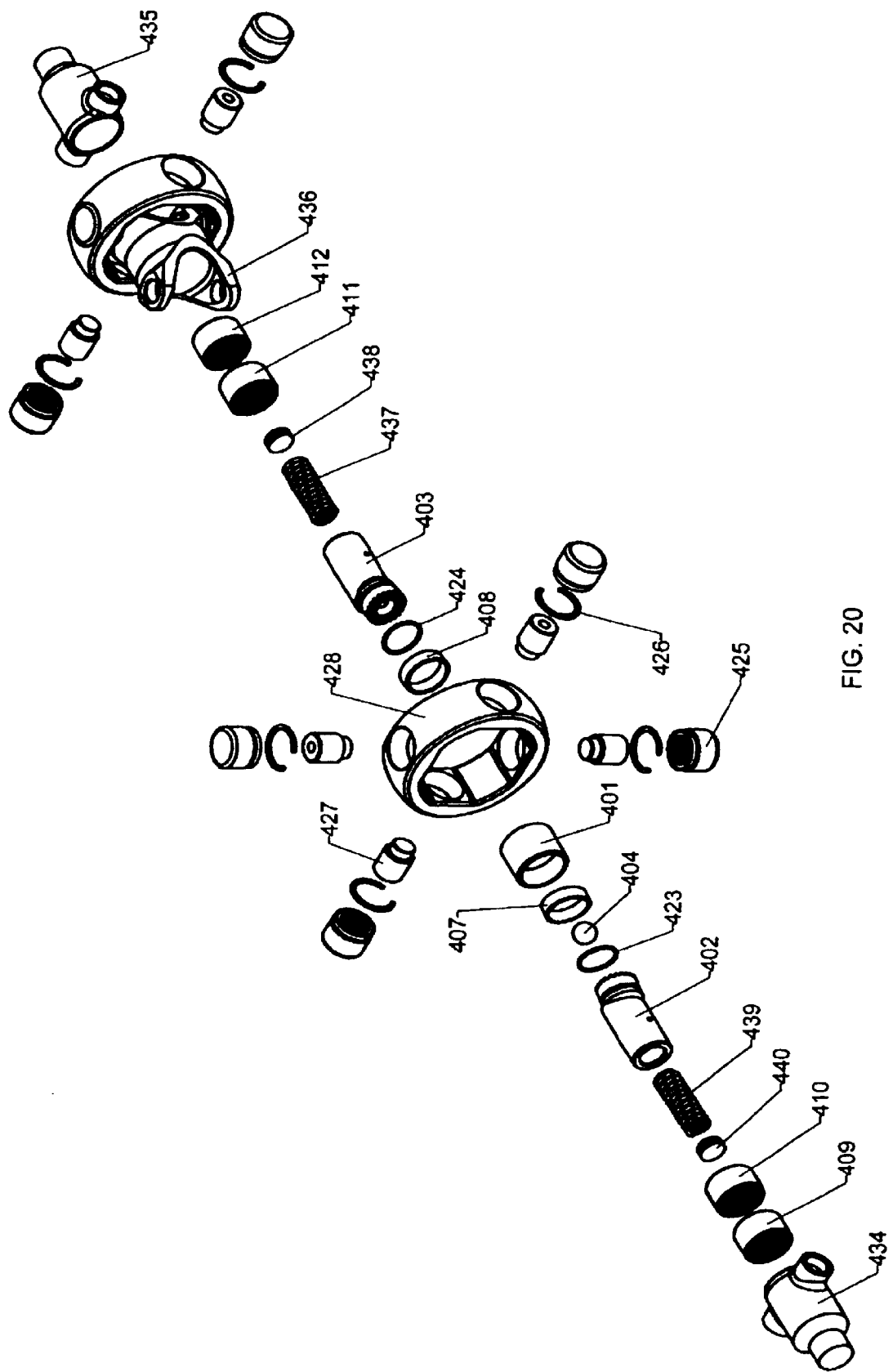
FIG. 20 is an exploded view of the fourth embodiment of the apparatus of the present invention.
Figure 21:
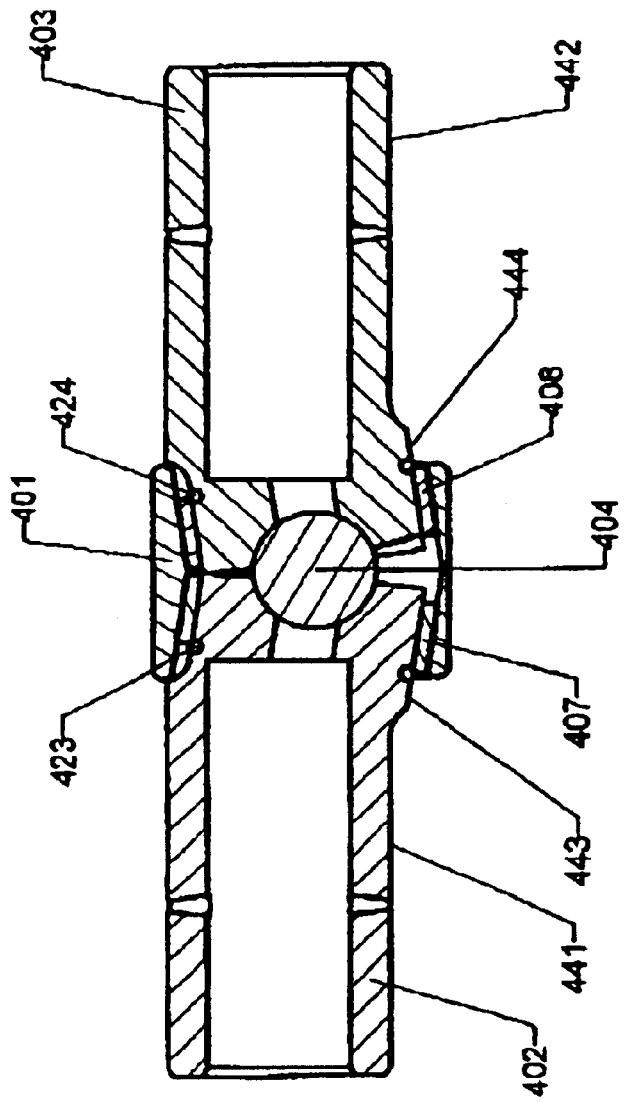
FIG. 21 is a partially sectional view of the centering mechanism of the fourth embodiment of the apparatus of the present invention with no angular centering mechanism displacement.

Angles 301A and 302B of bent rods 304, 305, and 306 together with angles 303C and 304D of cam rods 302 and 303, of FIG. 17, combine to create angles 305E and 306F of centering mechanism 300C. Angle 305E and angle 306F are always equal when cam rod 302 is rotated around bent rods 304, 305, and 306 causing an equal magnitude of rotation of cam rod 303. In other words if angle 301A is equal to angle 302B of bent rods 304, 305 and 306 and angle 303C is equal to angle 304D of cam rods 302 and 303 then when cam rod 302 is rotated around bent rod 304, 305 and 305 thereby rotating cam rod 303 then angle 305E will equal angle 306F. The sum of angles 305E and 306F can range from 0° through a maximum angle which equals the sum of angle 301A, 302B, 303C and 304D (e.g. 90°).

Universal joint 300 includes first shaft 334, second shaft 335, coupling means 336 for transmitting torque from the first shaft to the second shaft, and centering means 300C interconnecting the first shaft 334 and the second shaft 335 for causing the second shaft to move at the same angle relative to the coupling means as does the first shaft, the centering means comprising a first cam rod 302 and a second cam rod 303 longitudinally aligned with and rotatably connected to the first cam rod by a plurality of bent rods 304, 305, 306. The first cam rod 302 and the second cam rod 303 are connected at equal angles, and the axes of rotation of the first cam rod, bent rods and second cam rod intersect at the pivot points of the first and second shafts and the bisecting plane (shown schematically in universal joint 100 in FIG. 2) of the universal joint 300 which is perpendicular to the rotation axis of the coupling means. Cam tube 301 rotatably supports the first cam rod 302 and the second cam rod 302, and the first cam rod 302, the second cam rod 303, and the cam tube 303 rotatably support and interconnect the first shaft 334 and the second shaft 335 for causing the second shaft to move at the same angle relative to the coupling means (connecting yoke member 336) as does the first shaft.

Universal joint 400 includes a centering mechanism 400D for supporting the universal joint and forcing the two joint halves to operate at the same angle thereby causing joint 400 to operate at constant velocity at all angles. Each shaft 434, 435 of the joint 400 is rotatably connected to the centering mechanism 400D. Movement of one of the shafts 434, 435 at an angle relative to the longitudinal axis of the connecting yoke member 436 is transmitted to the other shaft 435, 434 by the centering mechanism 400D and the centering mechanism 400D causes the other shaft 435, 434 to likewise move at the same angle relative to the longitudinal axis of the connecting yoke member 436.

Universal joint 400 can be assembled by the following method:

First: Assembly of the Centering Mechanism 400D

Bearing seal assembly 407 is pressed into the bottom of hole 419 of cam tube 401. This method is repeated with bearing 408 in hole 420 of cam tube 401. Cam rod 402 is inserted into bearing seal assembly 407. Ball 404 is placed into socket 414 of cam rod 402. Cam rod 403 is inserted into bearing seal 408 so that gear teeth 415 and 416 are meshed together and so ball 404 is captured in sockets 413 and 414. This completes the assembly of the centering mechanism 400D.

Bearings 409 and 410 are inserted into hole 421 of the yoke of shaft 434. This process is repeated with bearings 411 and 412 in hole 422 of the yoke of shaft 435. Centering mechanism 400D is installed into joint 400 in the same manner that centering mechanism 300C is installed into joint 300. The same method of assembly of joint 300 can be used for the assembly of joint 400.

Figure 22:
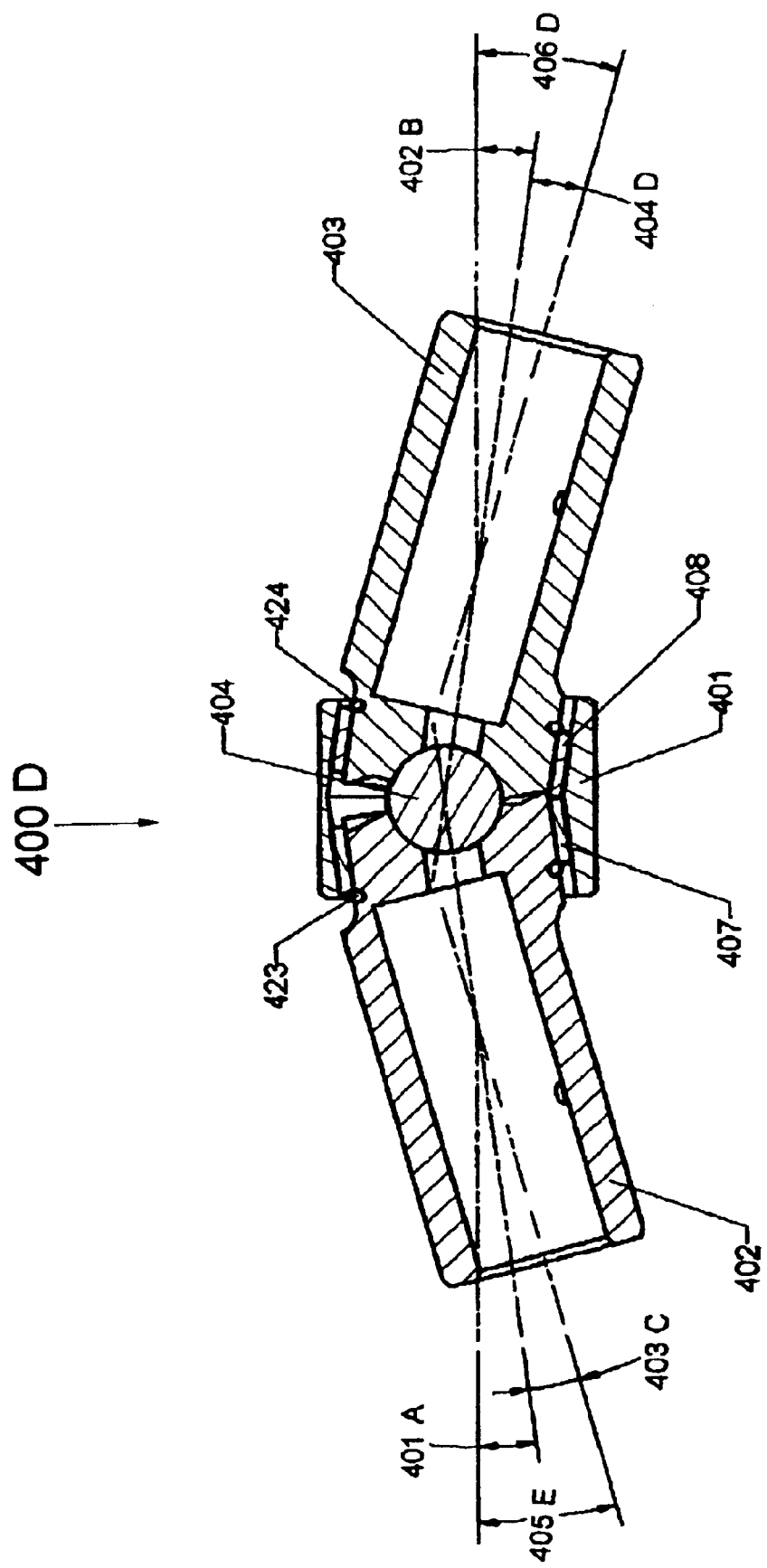
FIG. 22 is a partially sectional view of the centering mechanism of the fourth embodiment of the apparatus of the present invention with angular centering mechanism displacement.
Figure 23:
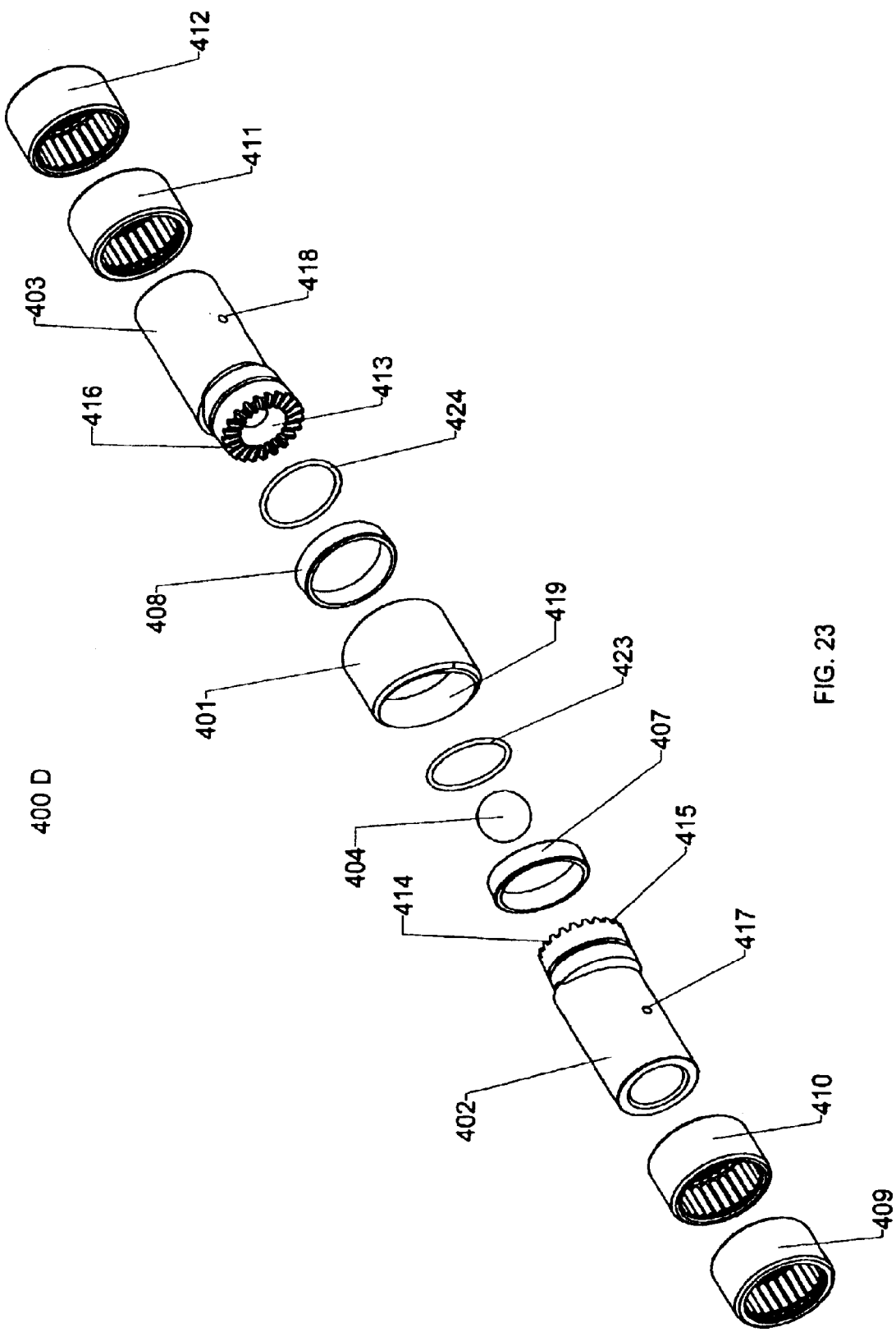
FIG. 23 is an exploded view of the centering mechanism of the fourth embodiment of the apparatus of the present invention.
Figure 24:
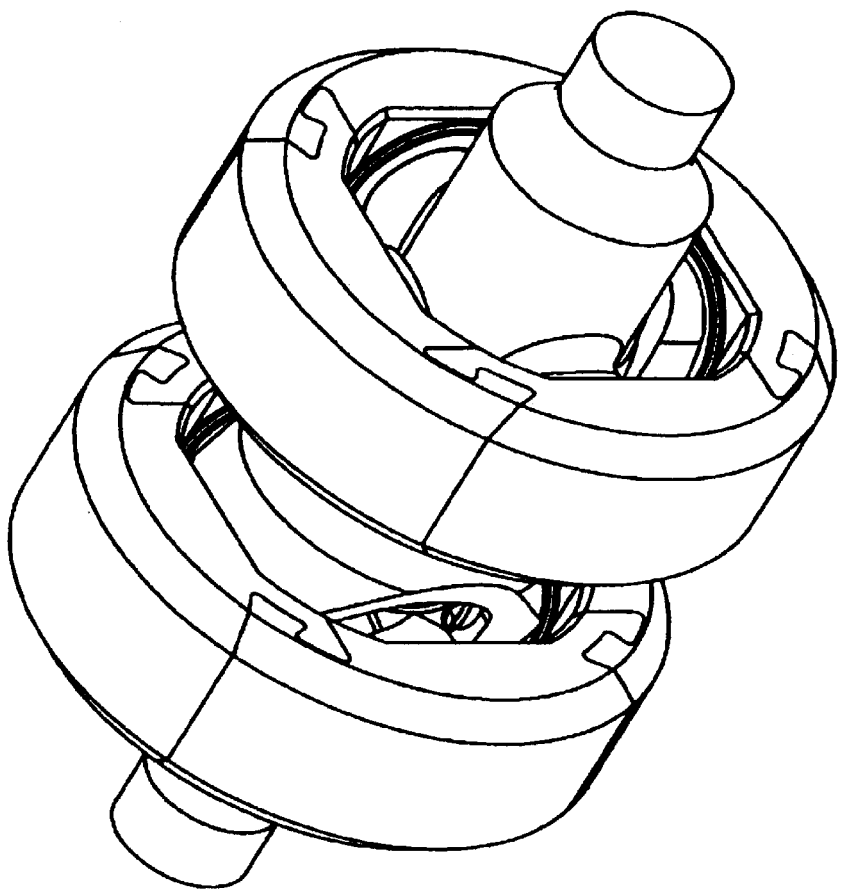
FIG. 24 is an isometric perspective view of a fifth embodiment of the apparatus of the present invention with no angular joint displacement.
Figure 25:
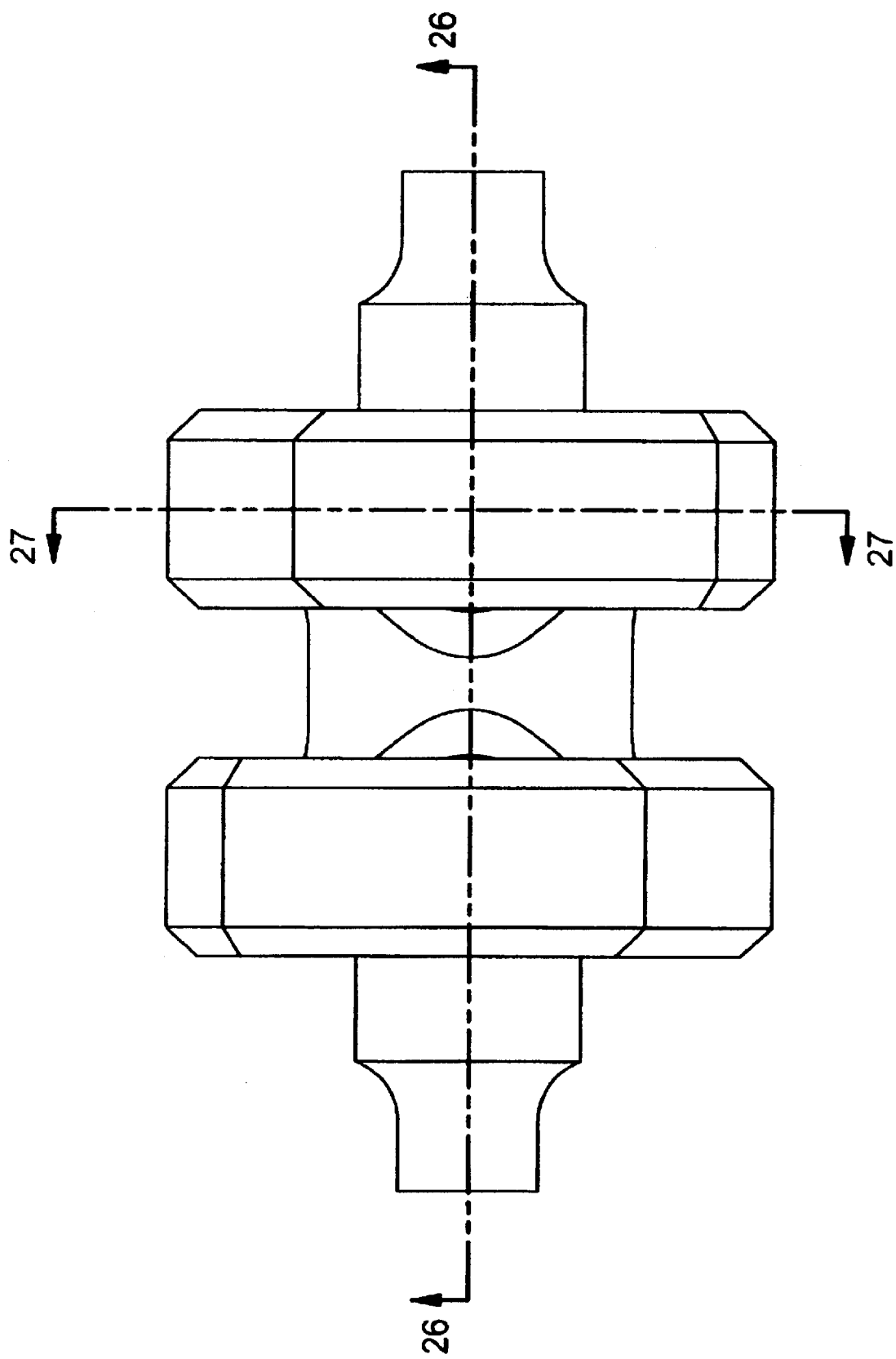
FIG. 25 is a perspective view of the fifth embodiment of the apparatus of the present invention showing locations of sections 26—26 and 27—27.

Angles 401A and 402B of cam tube 401 together with angles 403C and 404D of cam rods 402 and 403, of FIG. 22, combine to create angles 405E and 406F of centering mechanism 400D. Angle 405E and angle 406F are always equal when cam rod 402 is rotated within cam tube 401 causing an equal magnitude of rotation of cam rod 403 within cam tube 401. In other words if angle 401A is equal to angle 402B of cam tube 401 and angle 403C is equal to angle 404D of cam rods 402 and 403 then when cam rod 402 is rotated with cam tube 4301 thereby rotating cam rod 403 then angle 405E will equal angle 406F. Angles 405E and 406F can range from 0° through a maximum angle which equals the sum of angles 401A, 402B, 403C and 404D (e.g. 90°).

Assembly of joint 400 can be similar to prior art.

Even if not part of a universal joint (such as in robotics applications), centering mechanism 400D could also be used to join and support two tubes or beams, while allowing for angular misalignment of the two members.

Universal joint 500 differs from joints 100, 200, 300 and 400 in the construction of the rings. The rings (or ring assemblies) 537 and 538 are each composed off our identical quadrants which can be fitted together end to end in a manner which mechanically retains or locks the ring quadrants together. This method of ring construction and joint assembly can be advantageous over other methods for the following reasons.

1. Bearing surfaces can be machined or formed integral with the ring quadrant eliminating the need for a bearing cup.
2. Trunnion pins can be formed integral with the yoke members eliminating the need for separate trunnion pins.
3. Use of ring quadrants provides a more compact and stronger joint.
4. Ring quadrants could be made out of moldable, castable or formable plastics and metals reducing or eliminating machining operations.
5. Ring quadrants can be affixed to one another by interference fit or adhesives or welding.

Universal joint 500 includes a first ring 537 made of a plurality of ring segments 501, 502, 503, 504 which are fitted together end-to-end in a manner to mechanically retain the ring segments together and a second ring 538 made of a plurality of ring segments 505, 506, 507, 508 which are fitted together end-to-end in a manner to mechanically retain the ring segments together, a first yoke and a second yoke disposed within the first and second rings, respectively, and a first shaft 534 and a second shaft 535. First pin means (including pins 511, 512) pivotally interconnect the first yoke and the first ring 537. Second pin means (including pins 509 and 510) pivotally interconnect the first shaft 524 and the first ring 537. Third pin means pivotally interconnect the second yoke and the second ring 538. Fourth pin means pivotally interconnect the second shaft and the second ring. A coupling means interconnects the first yoke and the second yoke. The coupling means, first yoke, and second yoke form the coupling yoke member 536. A plurality of bearing means receive the pin means. The ring segments 501–508 are quadrants which are substantially identical to one another. Centering means (centering mechanism 300C) interconnects the first shaft 534 and the second shaft 535. The centering mechanism 300C includes first cam rod 302 and second cam rod 303 rotatably coupled to the first cam rod 302. The second cam rod 303 is longitudinally aligned with and rotatably connected to the first cam rod 302 by a plurality of bent rods 304, 305, 306.

Universal joint 500 can be assembled by the following method.

Figure 26:
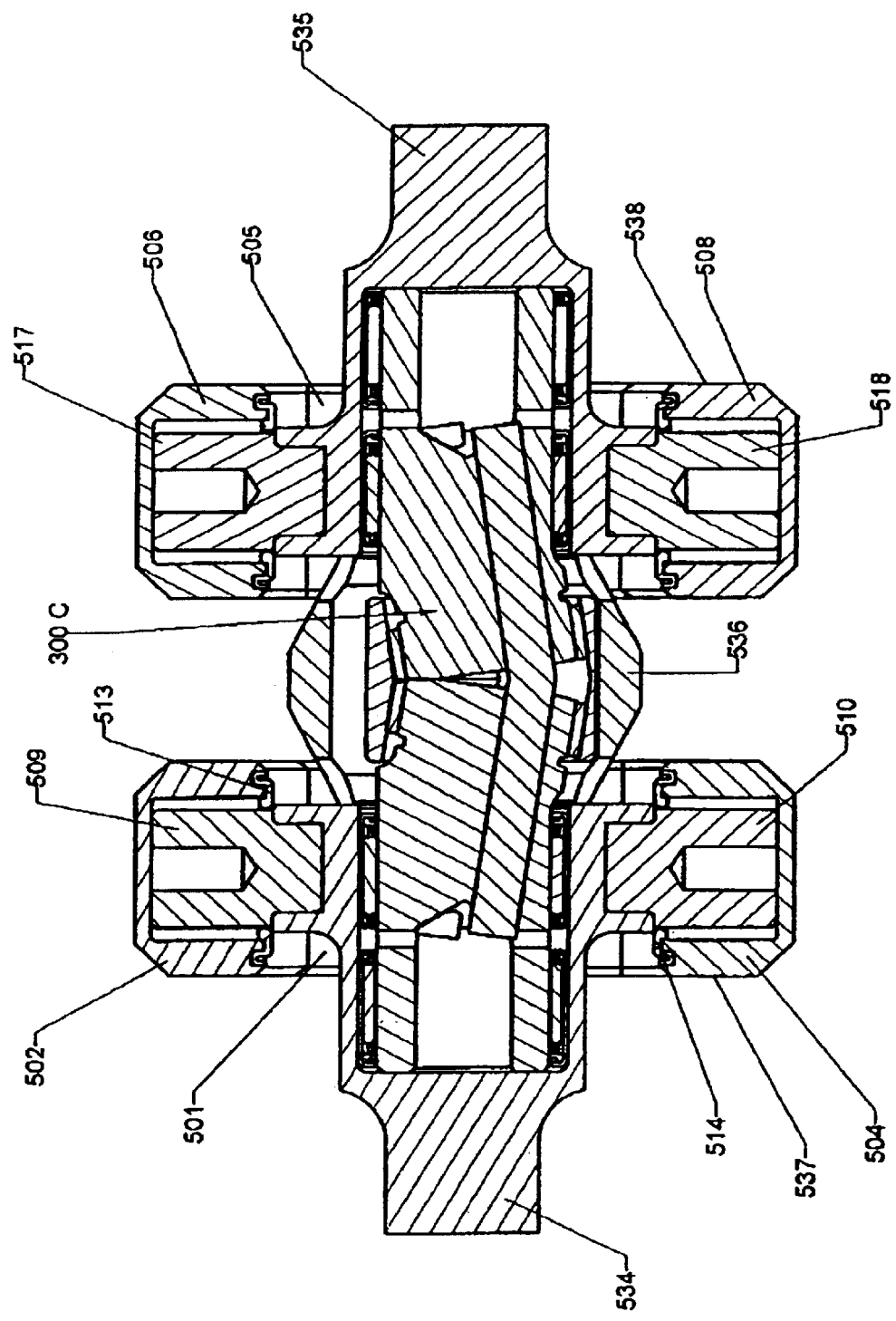
FIG. 26 is a perspective, partially sectional view, along section line 26—26, of the fifth embodiment of the apparatus of the present invention with no angular joint displacement.

Universal joint 500 can utilize centering mechanisms 100A, 200B, 300C, or 400D for internal support. FIG. 26 shows universal joint 500 with centering mechanism 300C. Centering mechanism 300C is installed in universal joint 500 in the same manner as described in the assembly of universal joint 300 above. Universal joint 500 can be assembled in the same manner as universal joints 100, 200, 300 and 400 if ring quadrants 501, 502, 503 and 504 are affixed to one another to form a ring, as well as ring quadrants 505, 506, 507 and 508 are affixed to one another to form a second ring.

Figure 27:
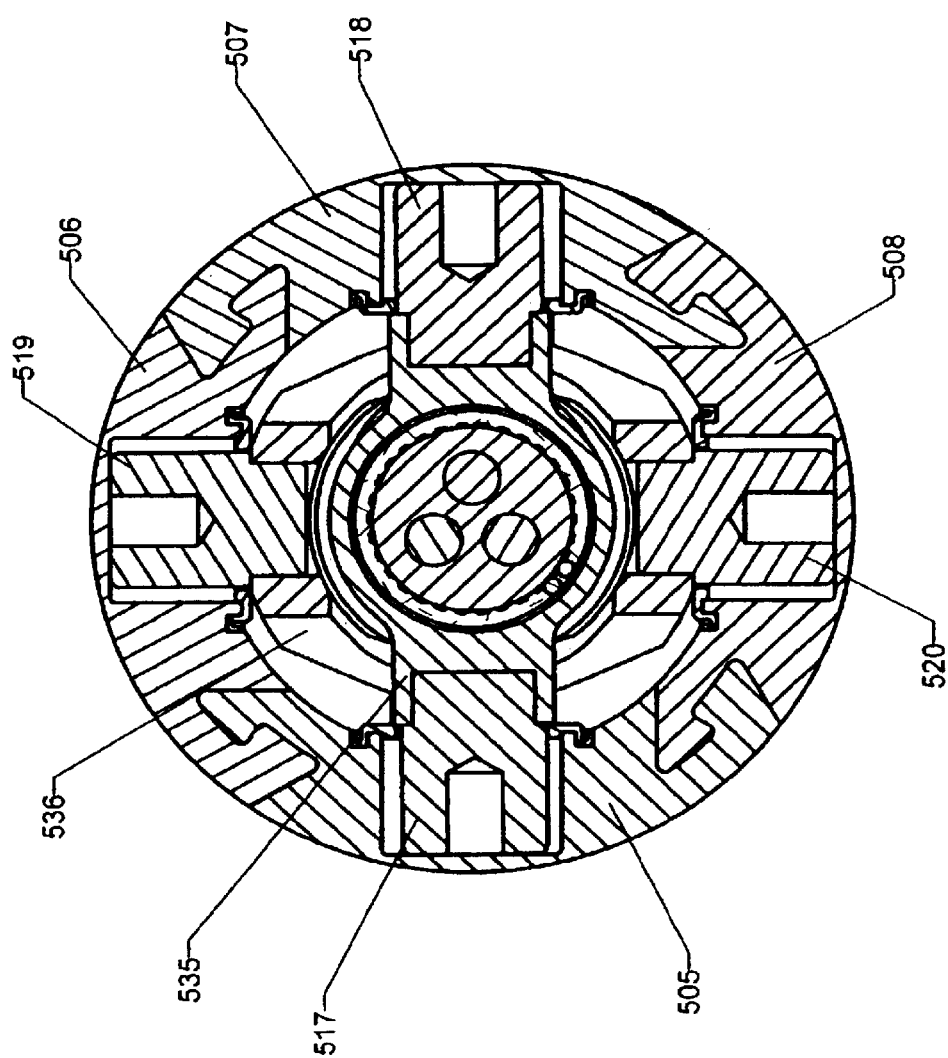
FIG. 27 is a perspective, partially sectional view, along section line 27—27, of the fifth embodiment of the apparatus of the present invention.
Figure 30:
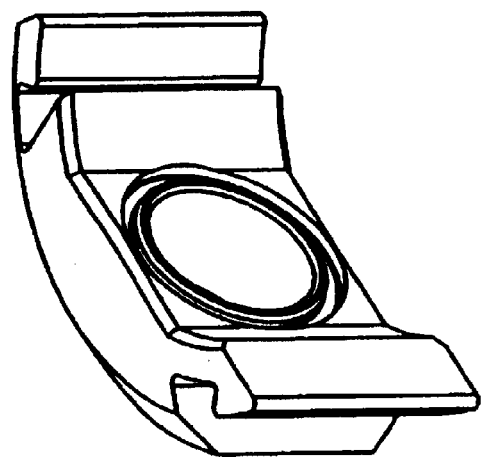
FIG. 30 is an isometric perspective of a ring quadrant of the fifth embodiment of the apparatus of the present invention.
Figure 28:
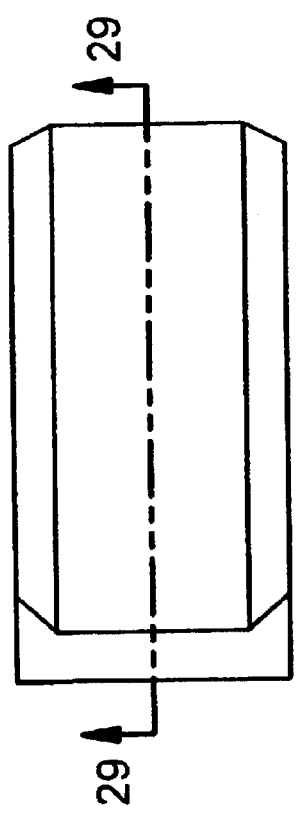
FIG. 28 is a side view of a ring quadrant of the fifth embodiment of the apparatus of the present invention.
Figure 29:
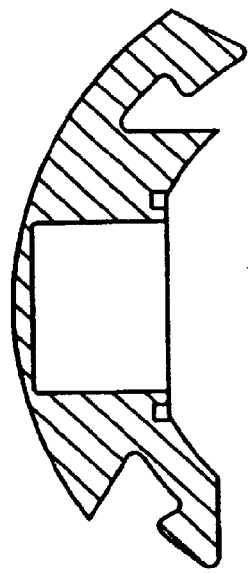
FIG. 29 is a partially sectional view, along section line 29—29 in FIG. 28, of a ring quadrant of the fifth embodiment of the apparatus of the present invention.
Figure 31:
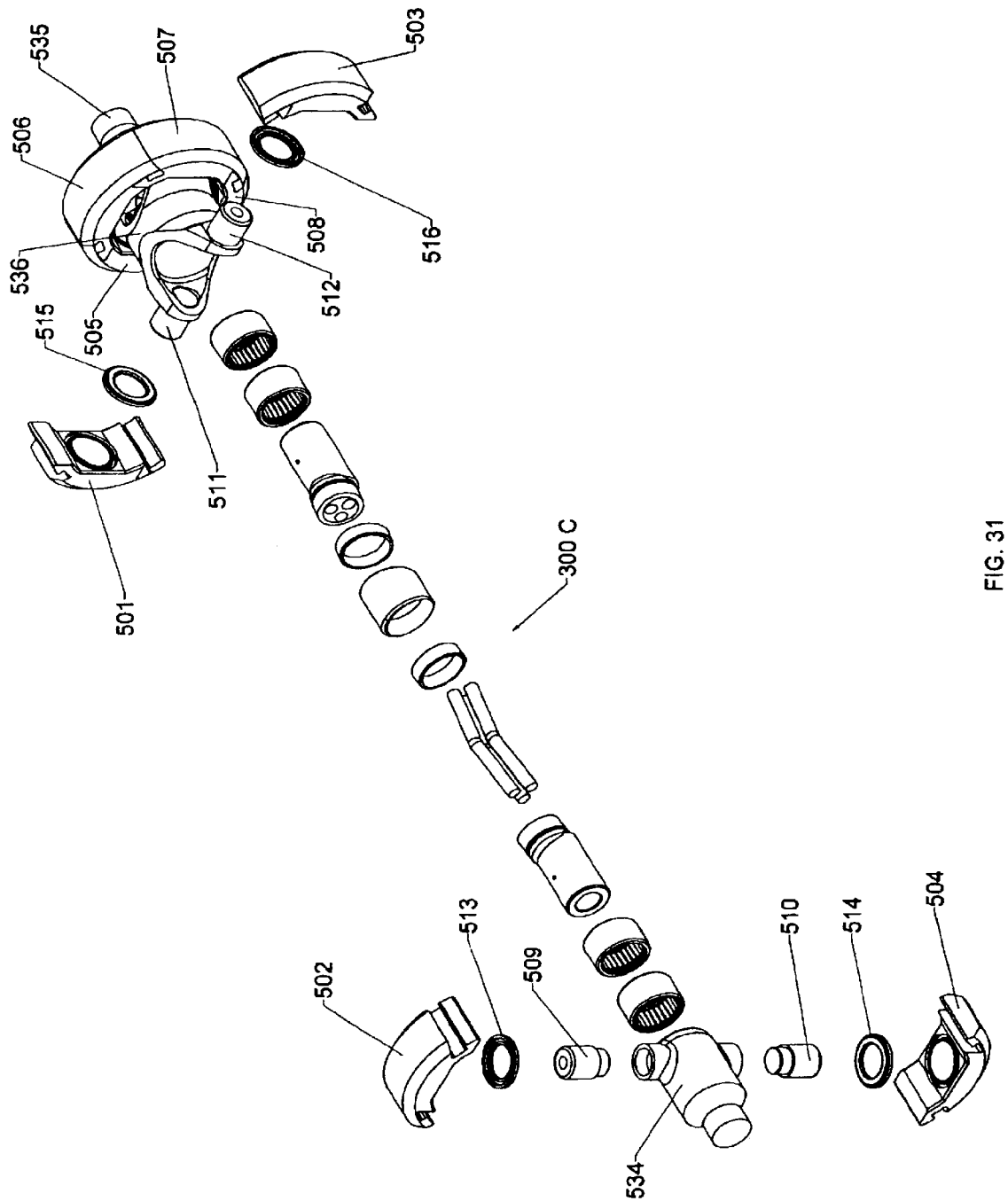
FIG. 31 is an exploded view of the fifth embodiment of the apparatus of the present invention.

If trunnion pins 509 and 510 were integral with shaft 534 and trunnion pins 511, 512, 519 and 520 were integral with coupling yoke member 536 and trunnion pins 517 and 518 were integral with shaft 535 then joint 500 would be assembled by the following method:

Ring quadrant 502 is installed over trunnion pin 509 and ring quadrant 504 is installed over trunnion pin 510. This process is repeated with ring quadrants 501, 503, 505, 506, 507 and 508 installed over trunnion pins 511, 512, 519, 520, 517 and 518. Centering mechanism 300C is placed within coupling yoke 536. Shaft 534 with ring quadrants 502 and 504 is affixed to coupling yoke member 536 with ring quadrants 501 and 503 by pressing the ends of ring quadrants 502 and 504 onto the ends of ring quadrants 501 and 503 as shown in FIG. 27. This process is repeated with connecting yoke member 536 and trunnion pins 519, 520 and ring quadrants 506 and 508 along with shaft 535 and trunnion pins 517 and 518 and ring quadrants 505 and 507.

Universal joint 500 includes a centering mechanism 300C for supporting the universal joint and forcing the two joint halves to operate at the same angle thereby causing joint 500 to operate at constant velocity at all angles. Each shaft 534, 535 of the joint 500 is rotatably connected to the centering mechanism 300C. Movement of one of the shafts 534, 435 at an angle relative to the longitudinal axis of the connecting yoke member 536 is transmitted to the other shaft 535, 534 by the centering mechanism 300C and the centering mechanism 300C causes the other shaft 535, 534 to likewise move at the same angle relative to the longitudinal axis of the connecting yoke member 536.

How the cam rod centering mechanism works:

The kinematics of joints 100, 200, 300, 400, and 500 are substantially identical to that of a Double Cardan universal joint, a description of which can be found in the Universal Joint and Drive Shaft Design Manual, AE-7, Published by the Society of Automotive Engineers, Inc. Like the Double Cardan joint, joints 100, 200, 300, 400, and 500 require the use of an internal support or centering mechanism 100A, 200B, 300C, 400D so that joints 100, 200, 300, 400 and 500 are self-supporting and self-aligning. Unlike the Double Cardan joint, joints 100, 200, 300, 400 and 500 transmit true constant velocity output at all operating joint angles. The use of internal support is not necessary when end support bearings are supplied for the input/output shafts (shafts 134, 135) such as in a marine stern-drive system. However, when only one end support is provided such as in automotive drivelines, axle driveshafts, and steering applications, the use of an internal support or a centering mechanism is necessary.

The centering devices of joint 100, 200, 300, 400, and 500 are advantageous over other centering mechanisms in the following ways: Centering devices of Double Cardan universal joints allow the joint to operate at a constant velocity at a maximum of two joint angles only, 0° and some design operating angle. Because the ball and socket of the Double Cardan joint drifts out of the bisecting angle plane of the two joint halves an error or inequality between the two joint halves is produced causing the joint to operate at near but not true constant velocity at all but 0° and one other angle. The effects of Double Cardan centering device location and function can be found on page 112 of SAE's Universal Joint And Drive Shaft Design Manual. Additionally, centering mechanisms of Double Cardan universal joints are required to move laterally with respect to the central axis of the connecting yoke which requires the connecting yoke to be larger. The centering mechanism of joints 100, 200, 300, 400 and 500 allow the joints to operate at true constant velocity at all joint angles from 0 to the joint's maximum misalignment capability. True constant velocity operation is achieved as a result of maintaining, for example, angle 105E equal to angle 106F at all operating joint angles.

Like the connecting yoke of the Double Card an joint the connecting yokes of joint 100, 200, 300, 400 and 500 do not rotate at a uniform speed when the joint is operating at an angle. This non-uniform motion can create objectionable noise, vibration, and harshness (NVH) in the drive train. It is therefore desirable to have a low mass moment of inertia of the connecting yoke member. Centering mechanisms 100A, 200B, 300C, 400D of joint 100, 200, 300, 400 and 500 allow for the design of a constant velocity universal joint which can have a coupling yoke member with a low mass moment of inertia without sacrificing high joint misalignment.

The centering devices 100A, 200B, 300C, 400D are advantageous over other universal joint centering mechanisms because they can provide support at high joint angles with no lateral movement of the centering mechanism within the coupling yoke member. Eliminating lateral movement of a centering mechanism allows designers to concentrate the mass of coupling yoke members closer to the joint's center of rotation thereby reducing the inertia excitation (vibration) caused by this component's non-uniform motion characteristics. Limitations in high operating angle are produced as a result of the large lateral displacement requirement of supporting mechanisms of Double Card an joints resulting in increased package size, operating angle limitations and driveline disturbances.

Novel features of the present invention include: there is no lateral movement of the centering mechanism with respect to the connecting yoke member, there is no axial displacement of the centering mechanism with respect to the input/output shafts; and each cam bar, in all three versions, have two axes in the same plane, which create the cam—the intersection of the two cam bar axes most preferably occurs at the joints' pivot center and bisecting angle plane of the joint for proper function.

PARTS LIST:

The following is a list of exemplary parts and materials suitable for use in the present invention:

| | |
|---|---|
| 101 | cam tube (preferably made Aluminum 6061-T6) |
| 102 | cam rod (8620 steel hardness of 60 HRC) |
| 103 | cam rod (8620 steel hardness of 60 HRC) |
| 104 | centering mechanism connecting yoke (Apex-Cooper Power Tools, Part No. MS20271 B16) |
| 105 | centering mechanism cube (Apex-Cooper Power Tools, part no. MS20271 B16) |
| 106 | centering mechanism cube (Apex-Cooper Power Tools, part no. MS20271 B16) |
| 107 | centering mechanism pin (Apex-Cooper Power Tools, part no. MS20271 B16) |
| 108 | centering mechanism pin (Apex-Cooper Power Tools, part no. MS20271 B16) |
| 109 | centering mechanism pin (Apex-Cooper Power Tools, part no. MS20271 B16) |
| 110 | centering mechanism pin (Apex-Cooper Power Tools, part no. MS20271 B16) |
| 111 | retaining pin (Fastenal spring pin, part no. 28092) |
| 112 | retaining pin (Fastenal spring pin, part no. 28092) |
| 113 | needle bearing assembly (Torrington Bearing Co. part no. B2020) |
| 114 | needle bearing assembly (Torrington Bearing Co. part no. B2020) |
| 115 | needle bearing assembly (Torrington Bearing Co. part no. JT2017) |

-continued

PARTS LIST:

The following is a list of exemplary parts and materials suitable for use in the present invention:

| | |
|---|---|
| 116 | needle bearing assembly (Torrington Bearing Co. part no. JT2017) |
| 117 | needle bearing assembly (Torrington Bearing Co. part no. JT2017) |
| 118 | needle bearing assembly (Torrington Bearing Co. part no. JT2017) |
| 119 | needle bearing assembly (Torrington Bearing Co. part no. B2020) |
| 120 | needle bearing assembly (Torrington Bearing Co. part no. B2020) |
| 121 | thrust bearing washer (Garlock Bearing Co. part no. G 12 DU) |
| 122 | thrust bearing washer (Garlock Bearing Co. part no. G 12 DU) |
| 123 | O-ring/thrust spring (Apple Rubber Co. part no. AS686691-118, 122, 125) |
| 124 | O-ring/thrust spring (Apple Rubber Co. part no. AS686691-118, 122, 125) |
| 125 | hole in cam rod 102 |
| 126 | hole in cam rod 103 |
| 127 | first angled hole in cam tube 101 |
| 128 | second angled hole in cam tube 101 |
| 129 | window in cam tube 101 |
| 130 | first pin access hole in cam tube 101 |
| 131 | second pin access hole in cam tube 101 |
| 132 | bearing spacer |
| 133 | bearing spacer |
| 134 | input/output shaft |
| 135 | input/output shaft |
| 136 | coupling yoke member |
| 137 | cover of cam tube 101 |
| 156 | ring |
| 157 | ring |
| 158 | band |
| 159 | band |
| 160 | needle bearing assembly |
| 161 | needle bearing assembly |
| 162 | needle bearing assembly |
| 163 | needle bearing assembly |
| 164 | trunnion pin (E9310 alloy steel, 60 HRC) |
| 165 | trunnion pin (E9310 alloy steel, 60 HRC) |
| 166 | trunnion pin (E9310 alloy steel, 60 HRC) |
| 167 | trunnion pin (E9310 alloy steel, 60 HRC) |
| 201 | cam tube (Aluminum 6061-T6 or Steel) |
| 202 | cam rod (E9310 alloy steel, 60 HRC) |
| 203 | cam rod (E9310 alloy steel, 60 HRC) |
| 204 | needle bearing assembly (Torrington Bearing Co. part no. DB76557N) |
| 205 | needle bearing assembly (Torrington Bearing Co. part no. B1010) |
| 206 | needle bearing assembly (Torrington Bearing Co. part no. DD-76433) |
| 207 | centering mechanism cube (Apex-Cooper Power Tool, part no. MS-20271-B8) |
| 208 | cover for cam tube 201 |
| 209 | thrust bearing (INA Bearing Co. part no. AXK-0414TN) |
| 210 | thrust washer (INA Bearing Co. part no. AS 0414) |
| 211 | plug seal |
| 212 | internal snap ring |
| 213 | bearing spacer |
| 214 | O-ring seal |
| 215 | O-ring seal |
| 216 | needle bearing assembly (Torrington Bearing Co, DB-76557N) |
| 217 | needle bearing assembly (Torrington Bearing Co, DB-76557N) |
| 218 | needle bearing assembly (Torrington Bearing Co, DB-76557N) |
| 219 | trunnion pin (E9310 alloy steel, 60 HRC) |
| 220 | needle bearing assembly (Torrington Bearing Co. part no. DD-76433) |
| 221 | bearing spacer |
| 222 | trunnion pin (E9310 alloy steel, 60 HRC) |
| 224 | needle bearing assembly (Torrington Bearing Co. part no. DD-76433) |
| 225 | needle bearing assembly (Torrington Bearing Co. part no. DD-76433) |
| 226 | trunnion pin (E9310 alloy steel, 60 HRC) |
| 227 | needle bearing assembly (Torrington Bearing Co, part no. B-1010) |
| 228 | needle bearing assembly (Torrington Bearing Co, part no. B-1010) |
| 230 | ring |
| 231 | ring |
| 232 | band |
| 233 | band |
| 234 | input/output shaft (alloy steel) |

-continued

PARTS LIST:

The following is a list of exemplary parts and materials suitable for use in the present invention:

| | |
|---|---|
| 235 | input output shaft (alloy steel) |
| 236 | coupling yoke member (alloy steel) |
| 237 | needle bearing assembly (Torrington Bearing Co, part no. DD-76433) |
| 238 | trunnion pin (E9310 alloy steel, 60 HRC |
| 301 | cam tube (aluminum or alloy steel) |
| 302 | cam rod (E9310 alloy steel, 60 HRC) |
| 303 | cam rod (E9310 alloy steel, 60 HRC) |
| 304 | bent rod (E4340 alloy steel, 50 HRC) |
| 305 | bent rod (E4340 alloy steel, 50 HRC) |
| 306 | bent rod (E4340 alloy steel, 50 HRC) |
| 307 | bearing seal (Garlock 18DP06) |
| 308 | bearing seal (Garlock 18DP06) |
| 309 | needle bearing assembly (Torrington Bearing Co, part no. JT-1813) |
| 310 | needle bearing assembly (Torrington Bearing Co, part no. JT-1813) |
| 311 | needle bearing assembly (Torrington Bearing Co, part no. JT-1813) |
| 312 | needle bearing assembly (Torrington Bearing Co, part no. JT-1813) |
| 324 | bearing cup |
| 325 | bearing cup |
| 326 | bearing cup |
| 327 | bearing cup |
| 328 | trunnion pin |
| 329 | trunnion pin |
| 330 | trunnion pin |
| 331 | trunnion pin |
| 334 | input/output shaft |
| 335 | input/output shaft |
| 336 | connecting yoke member |
| 339 | ring |
| 340 | ring |
| 341 | O-ring seal |
| 342 | O-ring seal |
| 401 | cam tube |
| 402 | cam rod |
| 403 | cam rod |
| 404 | ball (bearing steel, 60 HRC) |
| 407 | bearing seal |
| 408 | bearing seal |
| 409 | needle bearing assembly (Torrington Bearing Co, part no. JT-1813) |
| 410 | needle bearing assembly (Torrington Bearing Co, part no. JT-1813) |
| 411 | needle bearing assembly (Torrington Bearing Co, part no. JT-1813) |
| 412 | needle bearing assembly (Torrington Bearing Co, part no. JT-1813) |
| 423 | O-ring seal |
| 424 | O-ring seal |
| 425 | needle bearing assembly |
| 426 | bearing retaining ring |
| 427 | trunnion pin |
| 428 | ring |
| 434 | input/output shaft |
| 435 | input/output shaft |
| 436 | coupling yoke |
| 437 | spring |
| 438 | thrust bearing |
| 439 | spring |
| 440 | thrust bearing |
| 501 | ring quadrant |
| 502 | ring quadrant |
| 503 | ring quadrant |
| 504 | ring quadrant |
| 505 | ring quadrant |
| 506 | ring quadrant |
| 507 | ring quadrant |
| 508 | ring quadrant |
| 509 | trunnion pin |
| 510 | trunnion pin |
| 511 | trunnion pin |
| 512 | trunnion pin |
| 513 | bearing seal |
| 514 | bearing seal |
| 515 | bearing seal |
| 516 | bearing seal |
| 517 | trunnion pin |
| 518 | trunnion pin |
| 519 | trunnion pin |

-continued

PARTS LIST:

The following is a list of exemplary parts and materials suitable for use in the present invention:

| | |
|---|---|
| 520 | trunnion pin |
| 534 | input/output shaft |
| 535 | input/output shaft |
| 536 | coupling yoke member |
| 537 | ring assembly |
| 538 | ring assembly |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

What is claimed is:

1. A universal joint comprising:
   (a) first and second rings;
   (b) first and second yokes disposed within the first and second rings, respectively;
   (c) first and second shafts;
   (d) first pin means pivotally interconnecting the first yoke and the first ring;
   (e) second pin means pivotally interconnecting the first shaft and the first ring;
   (f) third pin means pivotally interconnecting the second yoke and the second ring;
   (g) fourth pin means interconnecting the second shaft and the second ring;
   (h) a coupling means interconnecting the first yoke and the second yoke;
   (i) a plurality of bearing means receiving the pin means; and
   (j) centering means interconnecting the first shaft and the second shaft, the centering means comprising a first cam rod rotatably coupled to a second cam rod, wherein:
      (i) the first cam rod includes a first section having a first axis of rotation and a second section, offset from the first section, having a second axis of rotation; and
      (ii) the second cam rod includes a first section having a first axis of rotation and a second section, offset from the first section, having a second axis of rotation.

2. The universal joint of claim 1, wherein there are bearing means in each ring, the bearing means in the first ring receiving the first and second pin means, and the bearing means in the second ring receiving the third and fourth pin means.

3. The universal joint of claim 1, wherein:
   the first and second pin means have pivot centers and the third and fourth pin means have pivot centers; and
   the axes of rotation of the first cam rod intersect the pivot centers of the first and second pin means and the axes of rotation of the second cam rod intersect the pivot centers of the third and fourth pin means.

4. The universal joint of claim 1, wherein the first and second pin means have pivot centers and the third and fourth pin means have pivot centers, the first cam rod has axes of rotation and the second cam rod has axes of rotation, and the axes of rotation of the first cam rod intersect the pivot centers of the first and second pin means and the axes of rotation of the second cam rod intersect the pivot centers of the third and fourth pin means.

5. The universal joint of claim 1, further comprising a cam tube which receives and supports the cam rods, wherein both cam rods are rotatably supported at equal angles within the cam tube.

6. The universal joint of claim 1, wherein:
   the first and second pin means have pivot centers and the third and fourth pin means have pivot centers;
   the axes of rotation of the first cam rod intersect one another at the pivot centers of the first and second pin means and the axes of rotation of the second cam rod intersect one another at the pivot centers of the third and fourth pin means;
   the coupling means has a longitudinal axis;
   the longitudinal axis of the coupling means intersects the axes of rotation of the first cam rod where the axes of rotation of the first cam rod intersect one another; and
   the longitudinal axis of the coupling means intersects the axes of rotation of the second cam rod where the axes of rotation of the second cam rod intersect one another.

7. A universal joint comprising:
   (a) first and second shafts;
   (b) coupling means for transmitting torque from the first shaft to the second shaft;
   (c) centering means interconnecting the first shaft and the second shaft for causing the second shaft to move at the same angle relative to the coupling means as does the first shaft, the centering means comprising a first cam rod and a second cam rod rotatably coupled to the first cam rod, wherein:
      (i) each cam rod includes a first straight section and a second straight section,
      (ii) each straight section has a longitudinal axis,
      (iii) the longitudinal axes of the two straight sections form an angle, and
      (iv) the angle of the first cam rod is equal to the angle of the second cam rod.

8. The universal joint of claim 7, further comprising a cam tube, and wherein both cam rods are rotatably supported at equal angles within the cam tube.

9. The universal joint of claim 8, wherein the cam tube includes bores which support the cam rods at equal angles to each other, and which are the same angle as the cam rods, such that when rotating the coupled cam rods within the cam tube, the axes of the second straight sections of the cam rods can align themselves to one another or can be misaligned with respect to one another up to an angle equal to four times the angle of the cam rod.

10. The universal joint of claim 1, wherein: the first cam rod is rotatably coupled to the second cam rod by a pin and cube universal joint which is supported within a cam tube.

11. The universal joint of claim 7, wherein:
   each section has an axis of rotation;
   the axes of rotation of the two sections in each cam rod intersect one another;
   the coupling means has a longitudinal axis;
   the longitudinal axis of the coupling means intersects the axes of rotation of the first cam rod where the axes of rotation of the first cam rod intersect one another; and
   the longitudinal axis of the coupling means intersects the axes of rotation of the second cam rod where the axes of rotation of the second cam rod intersect one another.

12. A universal joint comprising:
(a) first and second shafts;
(b) coupling means for transmitting torque from the first shaft to the second shaft;
(c) centering means interconnecting the first shaft and the second shaft for causing the second shaft to move at the same angle relative to the coupling means as does the first shaft, the centering means comprising a first cam rod and second cam rod longitudinally aligned at equal angles within a cam tube, wherein:
  (i) each cam rod includes a first straight section and a second straight section,
  (ii) each straight section has a longitudinal axis,
  (iii) the longitudinal axes of the two straight sections form an angle, and
  (iv) the angle of the first cam rod is equal to the angle of the second cam rod.

13. The universal joint of claim 12, wherein:
the first section of the first cam rod has a first axis of rotation and the second section of the first cam rod has a second axis of rotation;
the first section of the second cam rod has a first axis of rotation and the second section of the second cam rod has a second axis of rotation;
the axes of rotation of the first cam rod intersect one another;
the axes of rotation of the second cam rod intersect one another;
the coupling means has a longitudinal axis;
the longitudinal axis of the coupling means intersects the axes of rotation of the first cam rod where the axes of rotation of the first cam rod intersect one another; and
the longitudinal axis of the coupling means intersects the axes of rotation of the second cam rod where the axes of rotation of the second cam rod intersect one another.

14. A universal joint comprising:
(a) first and second shafts;
(b) coupling means for transmitting torque from the first shaft to the second shaft;
(c) centering means interconnecting the first shaft and the second shaft for causing the second shaft to move at the same angle relative to the coupling means as does the first shaft, the centering means comprising a first cam rod and a second cam rod longitudinally aligned with and rotatably connected to the first cam rod by a plurality of bent rods, wherein:
  (i) each cam rod includes a first straight section and a second straight section,
  (ii) each straight section has a longitudinal axis,
  (iii) the longitudinal axes of the two straight sections form an angle, and
  (iv) the angle of the first cam rod is equal to the angle of the second cam rod.

15. The universal joint of claim 14, wherein the first cam rod and the second cam rod are connected at equal angles, the coupling means has an axis of rotation, there is a bisecting plane of the universal joint which is perpendicular to the axis of rotation of the coupling means, and the axes of rotation of the first cam rod, bent rods and second cam rod intersect at the pivot points of the first and second shafts and the bisecting plane of the universal joint.

16. The universal joint of claim 14, further comprising a cam tube rotatably supporting the first cam rod and the second cam rod, and whereby the first cam rod, the second cam rod, and the cam tube rotatably support and interconnect the first shaft and the second shaft for causing the second shaft to move at the same angle relative the coupling means as does the first shaft.

17. The universal joint of claim 14, wherein:
the first cam rod includes a first section having a first axis of rotation and a second section having a second axis of rotation;
the second cam rod includes a first section having a first axis of rotation and a second section having a second axis of rotation;
the axes of rotation of the first cam rod intersect one another;
the axes of rotation of the second cam rod intersect one another;
the coupling means has a longitudinal axis;
the longitudinal axis of the coupling means intersects the axes of rotation of the first cam rod where the axes of rotation of the first cam rod intersect one another; and
the longitudinal axis of the coupling means intersects the axes of rotation of the second cam rod where the axes of rotation of the second cam rod intersect one another.

18. A universal connector comprising:
(a) a first cam rod;
(b) a second cam rod;
(c) a cam tube, wherein the first cam rod is rotatably coupled to the second cam rod, and wherein both cam rods are rotatably supported at equal angles within the cam tube;
(d) connection means for connecting the first cam rod to a first member and for connecting the second cam rod to a second member, wherein:
  (i) each cam rod includes a first straight section and a second straight section,
  (ii) each straight section has a longitudinal axis,
  (iii) the longitudinal axes of the two straight sections form an angle, and
  (iv) the angle of the first cam rod is equal to the angle of the second cam rod.

19. The connector of claim 18, wherein the first and second members are shafts.

20. The connector of claim 18, wherein the first and second members are tubes.

21. The connector of claim 18, wherein the first and second members are construction members.

22. The universal joint of claim 18, wherein:
each section has an axis of rotation;
the axes of rotation of the first cam rod intersect one another;
the axes of rotation of the second cam rod intersect one another;
the coupling means has a longitudinal axis;
the longitudinal axis of the coupling means intersects the axes of rotation of the first cam rod where the axes of rotation of the first cam rod intersect one another; and
the longitudinal axis of the coupling means intersects the axes of rotation of the second cam rod where the axes of rotation of the second cam rod intersect one another.

23. A universal joint comprising:
(a) first and second rings, each ring comprising a plurality of ring segments which are fitted together end-to-end in a manner to mechanically retain the ring segments together;
(b) first and second yokes disposed within the first and second rings, respectively;

(c) first and second shafts;

(d) first pin means pivotally interconnecting the first yoke and the first ring;

(e) second pin means pivotally interconnecting the first shaft and the first ring;

(f) third pin means pivotally interconnecting the second yoke and the second ring;

(g) fourth pin means interconnecting the second shaft and the second ring;

(h) a coupling means interconnecting the first yoke and the second yoke;

(I) a plurality of bearing means receiving the pin means.

24. The universal joint of claim 23, wherein the ring segments are quadrants.

25. The universal joint of claim 24, wherein the quadrants are substantially identical to one another.

26. The universal joint of claim 23, further comprising centering means interconnecting the first shaft and the second shaft, the centering means comprising a first cam rod and a second cam rod rotatably coupled to the first cam rod.

27. The universal joint of claim 26, wherein the second cam rod is longitudinally aligned with and rotatably connected to the first cam rod by a plurality of bent rods.

28. The universal joint of claim 26, wherein:

the first cam rod includes a first section having a first axis of rotation and a second section, having a second axis of rotation;

the second cam rod includes a first section having a first axis of rotation and a second section having a second axis of rotation;

the first and second pin means have pivot centers and the third and fourth pin means have pivot centers;

the axes of rotation of the first cam rod intersect one another at the pivot centers of the first and second pin means and the axes of rotation of the second cam rod intersect one another at the pivot centers of the third and fourth pin means;

the coupling means has a longitudinal axis;

the longitudinal axis of the coupling means intersects the axes of rotation of the first cam rod where the axes of rotation of the first cam rod intersect one another; and the longitudinal axis of the coupling means intersects the axes of rotation of the second cam rod where the axes of rotation of the second cam rod intersect one another.

29. A centering means for a universal joint comprising first and second shafts and a coupling means for transmitting torque from the first shaft to the second shaft, the centering means including means for interconnecting the first shaft and the second shaft for causing the second shaft to move at the same angle relative to the coupling means as does the first shaft, and the centering means comprising a first cam rod and a second cam rod rotatably coupled to the first cam rod, wherein:

(i) each cam rod includes a first straight section and a second straight section, (ii) each straight section has a longitudinal axis, (iii) the longitudinal axes of the two straight sections form an angle, and (iv) the angle of the first cam rod is equal to the angle of the second cam rod.

30. The centering means of claim 29, further comprising a cam tube, and wherein both cam rods are rotatably supported at equal angles within the cam tube.

31. The centering means of claim 30, wherein the cam tube includes bores which support the cam rods at equal angles to each other, and which are the same angle as the cam rods, such that when rotating the coupled cam rods within the cam tube, the axes of the second straight sections of the cam rods can align themselves to one another or can be misaligned with respect to one another up to an angle equal to four times the angle of the cam rod.

32. The universal joint of claim 29, wherein:

each section has an axis of rotation;

the axes of rotation of the two sections in each cam rod intersect one another;

the coupling means has a longitudinal axis;

the longitudinal axis of the coupling means intersects the axes of rotation of the first cam rod where the axes of rotation of the first cam rod intersect one another; and the longitudinal axis of the coupling means intersects the axes of rotation of the second cam rod where the axes of rotation of the second cam rod intersect one another.

* * * * *